(12) United States Patent
Evans

(10) Patent No.: US 11,928,146 B2
(45) Date of Patent: Mar. 12, 2024

(54) PERPETUAL SYSTEM FOR CAPTURING, CURATING, PRESERVING, STORING, POSITIONING, RELIVING, AND SHARING MEMORIES

(71) Applicant: Memorythium Corporation, San Francisco, CA (US)

(72) Inventor: Geoff Evans, San Francisco, CA (US)

(73) Assignee: Memorythium Corporation, San Fransico, CA (US)

( * ) Notice: Subject to any disclaimer, the term of this patent is extended or adjusted under 35 U.S.C. 154(b) by 123 days.

(21) Appl. No.: 17/477,897

(22) Filed: Sep. 17, 2021

(65) Prior Publication Data

US 2022/0083585 A1 Mar. 17, 2022

Related U.S. Application Data

(60) Provisional application No. 63/079,637, filed on Sep. 17, 2020.

(51) Int. Cl.
| | |
|---|---|
| *G06F 16/00* | (2019.01) |
| *G06F 16/45* | (2019.01) |
| *G06F 16/48* | (2019.01) |
| *G06F 21/62* | (2013.01) |
| *G06N 20/00* | (2019.01) |

(52) U.S. Cl.
CPC .............. *G06F 16/45* (2019.01); *G06F 16/48* (2019.01); *G06F 21/6245* (2013.01); *G06N 20/00* (2019.01)

(58) Field of Classification Search
CPC ...... G06F 16/45; G06F 16/48; G06F 21/6245; G06N 20/00
See application file for complete search history.

(56) References Cited

U.S. PATENT DOCUMENTS

| | | | | |
|---|---|---|---|---|
| 2008/0184127 | A1* | 7/2008 | Rafey | G06F 16/4393 709/229 |
| 2011/0287407 | A1* | 11/2011 | Zenhausern | G16B 20/00 435/5 |
| 2013/0339440 | A1* | 12/2013 | Balassanian | H04L 67/306 709/204 |
| 2013/0339446 | A1* | 12/2013 | Balassanian | H04L 65/403 709/204 |
| 2021/0073272 | A1* | 3/2021 | Garrett | G06F 16/535 |
| 2021/0234669 | A1* | 7/2021 | Singh | H04L 63/0435 |

* cited by examiner

*Primary Examiner* — Jared M Bibbee
(74) *Attorney, Agent, or Firm* — Fredrikson and Byron P.A

(57) ABSTRACT

Techniques for maintaining and curating memories stored as data objects are described. A computing device receives a data object. The computing device analyzes, using a model, the data object to determine one or more classifications for the data object. The computing device stores the data object and the one or more classifications for the data object in a storage component of the computing device.

50 Claims, 22 Drawing Sheets

1110

PERPETUAL SYSTEM FOR CAPTURING, CURATING, PRESERVING, STORING, POSITIONING, RELIVING, AND SHARING MEMORIES

This application claims priority to U.S. Provisional Application No. 63/079,637, filed Sep. 17, 2020, which is incorporated by reference herein in its entirety.

TECHNICAL FIELD

The disclosure relates to a storage and curation device for data objects.

BACKGROUND

Human memories are leaky, fragile, and eventually disappear. Online storage services are unequitable, as many services mine personal data in order to sell users advertising, creating a data environment where the user is completely taken advantage of. Personal private memory data is collected, bought and sold without the full understanding and consent of the user. Network attached storage devices are not optimized for memories, are not real computers, may look cheap, and often work poorly. The hardware devices are not integrated properly with the software interface which customers must use. The way humans treat memories can and should be modified to reflect the importance of our precious memories of a lifetime. Rather, digital memories are spread out all over various platforms (e.g., computers, phones, online services, network attached devices, etc.) and are poorly designed for legacy transfer.

SUMMARY

In general, the disclosure describes a process for capturing, curating, preserving, storing, positioning, reliving, and sharing data objects, where the contents of those data objects include media and text that can be considered memories of a user of the computing device that performs the process.

In one example, the disclosure is directed to a method that includes receiving, by one or more processors of a computing device, a data object. The method further includes analyzing, by the one or more processors, using a model, the data object to determine one or more classifications for the data object. The method further includes storing, by the one or more processors, the data object and the one or more classifications for the data object.

In another example, the disclosure is directed to a computing device comprising one or more processors programmed to perform any of the methods of this disclosure.

In another example, the disclosure is directed to an apparatus comprising means for performing any of the methods of this disclosure.

In another example, the disclosure is directed to a non-transitory computer-readable storage medium comprising instructions that, when executed by one or more processors of a computing device, cause the one or more processors to perform any of the methods of this disclosure.

In another example, the disclosure is directed to a method comprising any of the methods of this disclosure.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
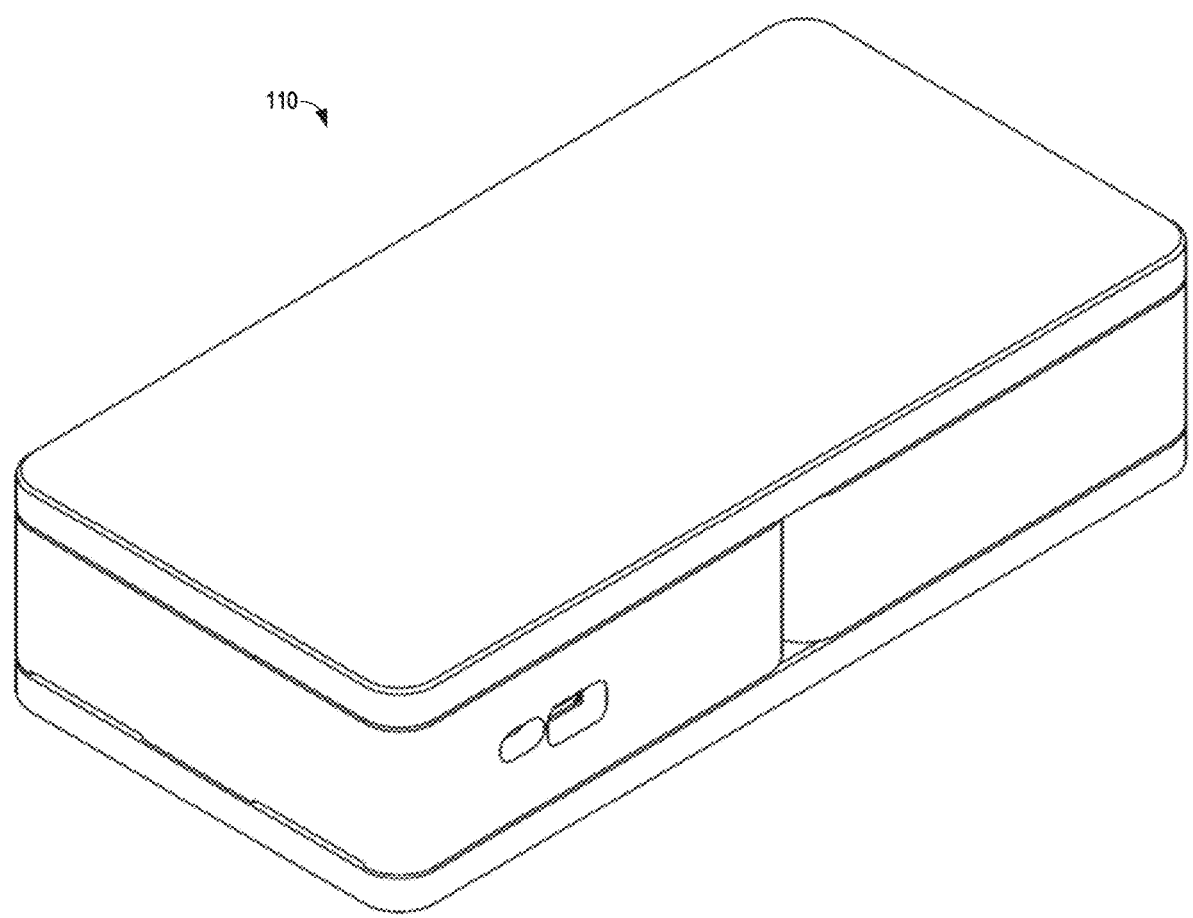
FIG. 1 is a conceptual diagram showing a top-front perspective view of an example computing device configured to perform the techniques described herein.

FIG. 1 is a conceptual diagram showing a top-front perspective view of an example computing device 110 configured to perform the techniques described herein. Computing device 110 may be any computing device, either standalone or connected with one or more other computing devices, that is configured to either store data objects locally or communicate with a cloud storage device to store the data objects in a central server. Computing device 110 may include a local or external power source, one or more ports for communicating with external input/output devices or control devices, and/or a communication unit to communicate with one or more external devices for the purpose of transmitting or receiving data objects. While FIG. 1 shows a specifically shaped example of computing device 110, computing device 110 is merely an example and is not meant to be limiting as to the physical look of computing device 110. Any computing device that may be configured to perform the techniques of this disclosure may be an example of computing device 110.

Computing device 110 may solve multiple problems. Human memories are leaky, fragile, and eventually fade. Online storage services may be unequitable. The tech giants mine user data in order to sell users advertising, creating a data environment where the user is completely taken advantage of Personal private memory data is collected, bought, and sold without the full understanding and consent of the user. Network attached storage devices are not optimized for memories, are not real computers, look cheap, and often work poorly. The hardware devices are not integrated properly with the software interface which customers must use. The way humans treat their memories can and should be modified to reflect the importance of precious memories of a lifetime. There is currently no product specifically designed to allow people to capture, curate and control their memories in a private yet powerful way. Digital memories are spread out all over (computers, phones, online services, network attached devices) and are poorly designed for legacy transfer. There is currently no product which allows people to capture and immediately store memories on a private, local device optimized for storing memories.

Computing device 110 may define a new way of taking care of the memories of a lifetime using artificial intelligence (AI). Computing device 110 may utilize a machine learning (AI) algorithm in a closed memory system to allow users to take control of their own memory data, including VPDV+AI files (Video/Photo/Documents/Voice plus Artificial Intelligence). Throughout this disclosure, "memories" may be used to describe such VPDV+AI files, or data objects in general. Computing device 110 may be an attractive and valuable physical box for digital memories. Computing device 110 being a physical possession adds levels of security. Computing device 110 may be elegant and is clearly something to keep, as a physical device may convey the high value commensurate with precious memories.

Computing device 110 may put the who, what, when, where, and why, plus context, in the user's hands to show what was special around important memories. Computing device 110 may look at the whole person with its services and AI, empowering capture of the essence of the individual.

The AI utilized by computing device 110 may make it easy for a user with no computer skills to upload, curate, collaborate, share, and relive memories. The algorithm must learn to do as many tasks as possible automatically, including tagging people, events, dates, places. The results from AI and human tagging go into the "Relive" section. Relive presents a steady stream of favorites for every user without having to lift a finger.

The AI may also become an expert at telling stories, choosing which story to tell at the right moment. By computing device 110 telling stories, computing device 110 may make the stories emotionally impactful, and may reward the AI for emotional stories. Computing device 110 may also provide memory therapy in this way, which may help people to feel better by reliving favorite memories.

To better classify memories, computing device 110 may ask AI memory questions to find favorite memories, bringing them forward. As such, computing device 110 may capture and describe the whole person. These files may even be included in memories giftbox files, or curated memories ready to be gifted, or a physical book of memories, in addition to general curated videos, immersive memories files, files for sharing in memory rooms (a dedicated virtual space for sharing memories) or personal website (creating a type of social media), a Wikipedia page, or private pages to share with others privately.

Computing device 110 may use the AI algorithm to learn about the given person and output some results, such as "X" files scanned or some stories about the user. The AI algorithm may initially focus on "Memory Curation". The user may be prompted to comment, explain, and elaborate on memories, either by voice, in writing, or both. The AI algorithm may sense what the user is doing and present appropriate options. For example, if the user takes a photo and sees "Curate? Y/N," the yes option may add time and location stamps, and automatically upload the memory to computing device 110.

The AI algorithm may access a mobile device's accelerometer and learn what the person is doing. Computing device 110 may then anticipate what memories the user might be uploading. This may be tightly integrated to an external device, such as a wearable bracelet or glasses, when it is being used.

In some instances, the highest level task performed by computing device 110 may be scanning. Computing device 110 may scan all information available about the user. Computing device 110 may scan social media accounts, storage, media files, etc., and record all important details.

Throughout the disclosure, examples are described where a computing device and/or a computing system may analyze information (e.g., locations, speeds, the content of the user interface, social media accounts, media files, incoming messages, etc.) associated with a computing device only if the computing device receives permission from the user to analyze the information. For example, in situations discussed below in which the computing device may collect or may make use of information associated with the user, the user may be provided with an opportunity to provide input to control whether programs or features of the computing device can collect and make use of user information (e.g., information about a user's current location, current speed, social media accounts, media files, etc.), or to dictate whether and/or how to the computing device may receive content that may be relevant to the user. In addition, certain data may be treated in one or more ways before it is stored or used by the computing device and/or computing system, so that personally-identifiable information is removed. For example, a user's identity may be treated so that no personally identifiable information can be determined about the user, or a user's geographic location may be generalized where location information is obtained (such as to a city, ZIP code, or state level), so that a particular location of a user cannot be determined. Thus, the user may have control over how information is collected about the user and used by the computing device.

Computing device 110 may also identify connections. In other words, the AI algorithm may learn about connections between users and output those results in some format to be determined.

Computing device 110 may also ask questions, or identify what parts of the user's story is most incomplete, prompting the user to fill in the missing information. This includes questionnaires.

Computing device 110 may also provide output. Computing device 110 may generate a result, or a story, in several forms (e.g., a book, website, interactive CyberGuy/Gal/ computerized avatar, etc.) about the person.

Computing device 110 may clean the data objects. The AI algorithm may learn to clean out the pauses, umms, and other unneeded blather from voice recording.

As the AI algorithm learns, computing device 110 may may provide feedback to the user about connections with other people, especially family and friends. Computing device 110 may also inform the user when a substantially updated version of their computerized avatar has been produced, showing what is missing or must be improved in their profile.

Computing device 110 may determine, after receiving user consent to do so, time-wise what a user did, when, and where, location-wise where a user was and when, work-wise what a user did, the results, the impact, and when, and what the user likes. Computing device 110 may put all this together in a searchable, publishable, save-able, share-able archive in printed, saved and published form. Computing device 110 may inform the user as to their progress (%) to completion and prompt the user to take action and answer questions. Computing device 110 may create questionnaires for AI Memory Questions which the user can complete easily, at their own pace, in written or verbal form.

Computing device 110 may look for the memories, figuring out what is missing and prompt the user to fill it all out. Computing device 110 may include interrogative software powered by that AI algorithm, a database of questions, and an interactive user interface featuring the computer-generated face of an artificial intelligence agent which studies the user's profile and memory folders to learn about the user. Computing device 110 may then ask the user questions about their memories either in writing or by voice interaction. Computing device 110 may adapt and adjust questions on-the-fly based on previous answers to get a more complete picture of the user's memories.

Computing device 110 may search all available information and produce Memory Questions (without user interaction). When the user is active in the application, computing device 110 may output a prompt. Memory questions can be asked and answered by text or voice. The AI looks at memory stubs and tries to determine priority (the most important ones), then puts those first for memory questions Computing device 110 may utilize AI-powered interactive software to prompt users to describe their memories. Computing device 110 may adapt and query the user about memories depending on the user's mood and indications of preferences. Computing device 110 may aim to get the user talking, providing coverage of their life history (who, what, when, where, why wherever possible), get the user remembering pleasant thoughts, and unburden the user of suppressed memories and regrets. Computing device 110 may transcribe the questions and answers and place the files into the user's memory files.

Memory questions may include a tree with branching patterns. How the questions branch depends on what data is available. If the profile is empty, questions may begin with name, year of birth, city of birth, and/or city of residence. If the data object begins with a photo, then computing device 110 may scan the metadata and enter the metadata into the database.

Computing device 110 may perform photo analysis to determine what is shown on the picture. If there are people, computing device 110 may attempt to identify them. If the data object begins with text, then computing device 110 may enter the text is into the database and analyzed. If the data object begins with voice, computing device 110 may convert the voice to text, enter the text into the database, and analyze the text.

After the first data object details are determined above, then computing device 110 may determine what memory questions to ask. As details are filled into the memories timeline, computing device 110 may determine what are the most important missing details and attempt to answer them by interacting with the user. If the user is active, computing device 110 may recognize this and ask the user to record more memories.

For AI memory questions, computing device 110 may implement a chat bot powered by an AI algorithm which asks the user questions about their memories. Questions can be asked either in writing, in the form of a chat discussion, or verbally by a text-to-voice generator which converts oral answers back into text. Computing device 110 may adapt the questions to focus in on what the user is most interested in. The questions and answers become an important part of the user's collection of memories. Computing device 110 may use the results of AI memory curation and AI memory questions for memory therapy, where a series of positive memories are presented to the user for the purpose of boosting their spirits.

Computing device 110 may generate an "AI agent," or a computerized avatar, based on the memories of the user. It is intended that this AI agent can be directed to interact with humans and other AI agents now and well into the future. The AI agent may be tasked with representing the interests of its owner now and after death, well into the future. This "future being," of sorts, may be owned by the private user, meaning that the user may also own the resulting algorithm that develops the computerized avatar generated based on a machine learning model and the user's own memories.

Computing device 110 may store the data objects in a blockchain structure for the purpose of authenticating memories. The use of blockchain technology ensures that the data associated with the data objects/memories is immutable and valid throughout the lifecycle. A blockchain is a series of blocks that are linked to one another using cryptography, such as a hash function. Each block of the blockchain includes a hashed version of the previous block of the blockchain, a timestamp of the update to the blockchain, the new information for the blockchain, and, potentially, additional information about the transaction adding the new information, such as a user identification or some other sort of metadata. The initial instance of a new transaction is issued from some node in the system and to another node in the system. If the issuer node is connected to each other node in the system, the issuer node may distribute the update to each other node in the system, enabling every node in the system to maintain an immutable, up-to-date version of the blockchain upon the blockchain being updated. In other instances, such as where the issuer node is not connected to other nodes in the system, a peer-to-peer network may be utilized to distribute the blocks throughout the nodes participating in the blockchain storage system. By including a hashed version of the previous block and a timestamp for each transaction in each block of the blockchain, nodes in the peer-to-peer network need not explicitly receive each block in the system, but may always ensure the node is storing the most up-to-date version of the blockchain possible through comparison of the timestamp in the most recent block stored on the node to a timestamp in the most recent block stored on another node in the peer-to-peer network.

Furthermore, each node may individually verify that any updates to the blockchain are valid using the hashed version of the previous block that must be included in any transaction to the blockchain. For instance, if a node determines that the hashed portion of a new transaction does, in fact, include the most recent block of the blockchain stored in the node, then the node may approve the transaction as a valid transaction. Conversely, if the node determines that the hashed portion of the new transaction does not include the most recent block of the blockchain stored in the node, then the node may determine the transaction is invalid. Furthermore, since each block includes a hash of the previous block, a most recent block of the blockchain would include, in order, a history of every valid transaction in the blockchain. As such, if the node determines that various details of the history of blocks hashed into the most recent block is incorrect, the node may determine that the new transaction is invalid. Furthermore, if the node determines that the timestamp information for the new block is incompatible with the most recent block in the blockchain, such as if the timestamp in the transaction is before a timestamp of the most recent block in the blockchain stored on the node, the node will determine that the transaction is invalid.

In this way, the video, photo, document, or voice files stored as the data objects are indelible, and incorruptible data objects that can safely store the digital memories uploaded by the user. Furthermore, the utilization of blockchain enables the creation of non-fungible tokens (NFTs). In this way, the data objects may have an intrinsic value and rights to the data objects may be transferrable.

Computing device 110 may also create memory rooms. Memory rooms may be a video meeting service where friends and family can gather virtually to curate memories together, where computing device 110 may store records of such meetings as data objects/memories.

Users of this service may also set aside rewards for future designated beneficiaries or legacy custodians of the user's AI avatar and curated, blockchained memories. Computing device 110 may empower the user to set aside money or other rewards to custodians and future custodians of the user's AI and memories far into the future. The user first specifies a set of wishes or desires around what he or she wants to have happen with his AI avatar and memories. The user's instructions are like an online will, which specifies rewards for carrying out the wishes of the user. This may include updating the AI avatar and memory files using the technology of the future. Memory Rewards are like an endowment for the care and upkeep of a person's memories and computerized avatars. Computing device 110 may be gifted or otherwise passed down.

Figure 2:
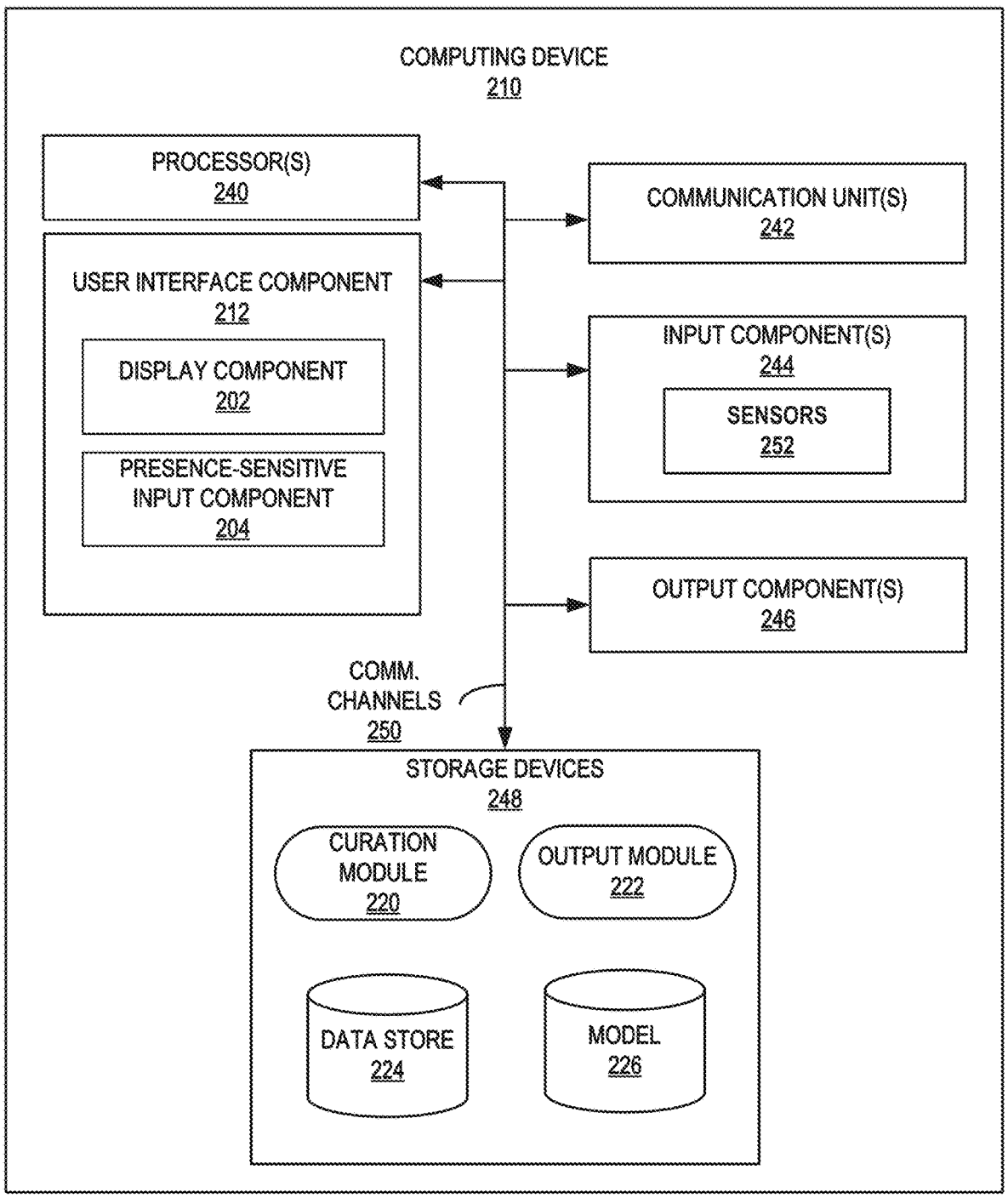
FIG. 2 is a block diagram illustrating a more detailed example of a computing device configured to perform the techniques described herein.

FIG. 2 is a block diagram illustrating an example computing device configured to determine a characteristic of received user input and output a corresponding set of sub-elements associated with an application on the computing device, in accordance with one or more aspects of the techniques described in this disclosure. Computing device 210 of FIG. 2 is described below as an example of computing device 110 of FIG. 1. FIG. 2 illustrates only one particular example of computing device 210, and many other examples of computing device 210 may be used in other instances and may include a subset of the components included in example computing device 210 or may include additional components not shown in FIG. 2. For instance, certain configurations of computing device 210 may merely include ports to receive external instances of user interface component 212, input components 244, and/or output components 246, or may communicate with external instances of user interface component 212, input components 244, and/or output components 246 via communication unit 242, such as over short-wavelength ultra high frequency (UHF) radio waves.

As shown in the example of FIG. 2, computing device 210 includes user interface device (UID) 212, one or more processors 240, one or more communication units 242, one or more input components 244, one or more output components 246, and one or more storage components 248. UID 212 includes display component 202 and presence-sensitive input component 204. Storage components 248 of computing device 210 include curation module 220, output module 222, data store 224, and model 226.

One or more processors 240 may implement functionality and/or execute instructions associated with computing device 210 to dynamically curate and perpetually provide access to memories contained in any of the data objects stored in data store 224. That is, processors 240 may implement functionality and/or execute instructions associated with computing device 210 to cause curation module 220 to analyze and curate data objects received according to model 226, and may also control output module 222 to output the contents of these data objects for a user of computing device 210 or for a different user of another computing device.

Examples of processors 240 include application processors, display controllers, auxiliary processors, one or more sensor hubs, and any other hardware configure to function as a processor, a processing unit, or a processing device. Modules 218, 220, 222, and 224 may be operable by processors 240 to perform various actions, operations, or functions of computing device 210. For example, processors 240 of computing device 210 may retrieve and execute instructions stored by storage components 248 that cause processors 240 to perform the operations described with respect to modules 220 and 222 utilizing model 226. The instructions, when executed by processors 240, may cause computing device 210 to analyze and curate data objects received according to model 226, and may also control output module 222 to output the contents of these data objects for a user of computing device 210 or for a different user of another computing device.

Curation module 220 may perform operations for managing data objects for computing device 210. For example, curation module 220 of computing device 210 may receive data objects captured by input components 244 or from an external computing device and analyze said data objects before storing the data objects in data store 224 along with the resulting classifications.

In some examples, output module 222 may execute locally (e.g., at processors 240) to provide functions associated with replaying the contents of data objects stored in data store 224. In some examples, output module 222 may act as an interface to a remote service accessible to computing device 210. For example, output module 222 may be an interface or application programming interface (API) to a remote server that provides the contents of data objects stored on other devices or servers to computing device 210 or to retrieve data objects from data store 224.

One or more storage components 248 within computing device 210 may store information for processing during operation of computing device 210 (e.g., computing device 210 may store data accessed by modules 220 and 222 during execution at computing device 210). In some examples, storage component 248 is a temporary memory, meaning that a primary purpose of storage component 248 is not long-term storage. Storage components 248 on computing device 210 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage components 248, in some examples, also include one or more computer-readable storage media. Storage components 248 in some examples include one or more non-transitory computer-readable storage mediums. Storage components 248 may be configured to store larger amounts of information than typically stored by volatile memory. Storage components 248 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage components 248 may store program instructions and/or information (e.g., data) associated with modules 220 and 222, data store 224, and model 226. Storage components 248 may include a memory configured to store data or other information associated with modules 220 and 222, data store 224, and model 226.

In some instances, one or more of storage components 248 may be removable. For instance, one of storage components 248 that includes data store 224 and model 226, may be a removable storage component that allows a user of computing device 210 to transfer the data objects stored in data store 224 and model 226 into a new computing device with different components, such as improved processors or updated components. In this way, data store 224 and model 226 may become future-proof by enabling transfer into newer models of computing device 210 or different computing devices that may be configured to generally perform the techniques described herein. The removable storage component may be any storage component capable of changing computing devices, such as a physical chip, a removable hard disk drive, or a removable solid state drive (SSD).

Communication channels 250 may interconnect each of the components 212, 240, 242, 244, 246, and 248 for inter-component communications (physically, communicatively, and/or operatively). In some examples, communication channels 250 may include a system bus, a network connection, an inter-process communication data structure, or any other method for communicating data.

One or more communication units 242 of computing device 210 may communicate with external devices via one or more wired and/or wireless networks by transmitting and/or receiving network signals on one or more networks. Examples of communication units 242 include a network interface card (e.g. such as an Ethernet card), an optical transceiver, a radio frequency transceiver, a GPS receiver, or any other type of device that can send and/or receive information. Other examples of communication units 242 may include short wave radios, cellular data radios, wireless network radios, as well as universal serial bus (USB) controllers.

One or more input components 244 of computing device 210 may receive input. Examples of input are tactile, audio, and video input. Input components 244 of computing device 210, in one example, includes a presence-sensitive input device (e.g., a touch sensitive screen, a PSD), mouse, keyboard, voice responsive system, camera, microphone or any other type of device for detecting input from a human or machine. In some examples, input components 244 may include one or more sensor components 252 one or more location sensors (GPS components, Wi-Fi components, cellular components), one or more temperature sensors, one or more movement sensors (e.g., accelerometers, gyros), one or more pressure sensors (e.g., barometer), one or more ambient light sensors, and one or more other sensors (e.g., infrared proximity sensor, hygrometer sensor, and the like). Other sensors, to name a few other non-limiting examples, may include a heart rate sensor, magnetometer, glucose sensor, olfactory sensor, compass sensor, or a step counter sensor.

One or more output components 246 of computing device 210 may generate output in a selected modality. Examples of modalities may include a tactile notification, audible notification, visual notification, machine generated voice notification, or other modalities. Output components 246 of computing device 210, in one example, includes a presence-sensitive display, a sound card, a video graphics adapter card, a speaker, a cathode ray tube (CRT) monitor, a liquid crystal display (LCD), a light emitting diode (LED) display, an organic LED (OLED) display, a virtual/augmented/extended reality (VR/AR/XR) system, a three-dimensional display, or any other type of device for generating output to a human or machine in a selected modality.

UID 212 of computing device 210 may include display component 202 and presence-sensitive input component 204. Display component 202 may be a screen, such as any of the displays or systems described with respect to output components 246, at which information (e.g., a visual indication) is displayed by UID 212 while presence-sensitive input component 204 may detect an object at and/or near display component 202.

While illustrated as an internal component of computing device 210, UID 212 may also represent an external component that shares a data path with computing device 210 for transmitting and/or receiving input and output. For instance, in one example, UID 212 represents a built-in component of computing device 210 located within and physically connected to the external packaging of computing device 210 (e.g., a screen on a mobile phone). In another example, UID 212 represents an external component of computing device 210 located outside and physically separated from the packaging or housing of computing device 210 (e.g., a monitor, a projector, etc. that shares a wired and/or wireless data path with computing device 210).

UID 212 of computing device 210 may detect two-dimensional and/or three-dimensional gestures as input from a user of computing device 210. For instance, a sensor of UID 212 may detect a user's movement (e.g., moving a hand, an arm, a pen, a stylus, a tactile object, etc.) within a threshold distance of the sensor of UID 212. UID 212 may determine a two or three-dimensional vector representation of the movement and correlate the vector representation to a gesture input (e.g., a hand-wave, a pinch, a clap, a pen stroke, etc.) that has multiple dimensions. In other words, UID 212 can detect a multi-dimension gesture without requiring the user to gesture at or near a screen or surface at which UID 212 outputs information for display. Instead, UID 212 can detect a multi-dimensional gesture performed at or near a sensor which may or may not be located near the screen or surface at which UID 212 outputs information for display.

In accordance with one or more techniques of this disclosure, curation module 220 may receive a data object. The data object may be one or more of a video object, a picture object, a text object, and an audio object. In receiving the data object, curation module 220 may, with user consent, retrieve the data object from a database associated with a social media platform, receive the data object sent from a media capture device, receive the data object from a secondary computing device via a wired transmission or a wireless transmission, or receive a transmission including the data object from a secondary storage device. For instance, in receiving the data object, curation module 220 may determine, based on one or more privacy settings, that a user has granted permission for the data object to be received by curation module 220. In response to determining that the user has granted permission for the data object to be received curation module 220, curation module 220 may receive the data object. In still other instances, in receiving the data object, curation module 220 may record a video conference with a plurality of users to create a video recording. Curation module 220 may save the video recording as the data object. In such instances, when curation module 220 classifies the video recording, the one or more classifications for the data object may include each of the plurality of users in the video conference.

Curation module 220 may analyze, using model 226, the data object to determine one or more classifications for the data object. Model 226 may be a machine learning model, or an AI model. In such instances, in analyzing the data object, curation module 220 may analyze, using model 226, one or more of content of the data object and metadata for the data object to determine the one or more classifications for the data object.

In some instances, curation module 220 may utilize model 226 by receiving the machine learning model from a server device that trains the machine learning model using data objects received from each of a plurality of computing devices. In other instances, curation module 220 may train model 226 itself, such as by receiving training data from a server device and updating model 226 based on the training data. In still other instances, curation module 220 may receive personal data collected by a third-party internet service and update the machine learning model based on the personal data. In still other instances, curation module 220 may train model 226 by outputting the one or more classifications for the data object, receiving an indication of first user input altering one or more of the one or more classifications to create one or more updated classifications, receiving an indication of second user input confirming one or more of the one or more classifications to create one or more confirmed classifications, and updating model 226 based on the one or more updated classifications and the one or more confirmed classifications.

Curation module 220 may perform an initial analysis on the data object to determine one or more uncertainties regarding the content of the data object. Curation module 220 may then create one or more inquiries (e.g., the above mentioned memory questions) for each of the one or more uncertainties. Curation module 220 may receive an answer for one or more of the one or more inquiries. Curation module 220 may then determine the one or more classifications for the data object based on the answer for the one or more of the one or more inquiries.

Curation module 220 may perform the initial analysis in a variety of ways, depending on the type of data object being analyzed. For instance, curation module 220 may determine content for the data object by performing an audio analysis to determine one or more audible words or sounds present in the data object, a graphical analysis to determine one or more living or non-living objects present in the data object, an optical character recognition to determine one or more visible words in the data object, or a metadata analysis to determine one or more of a location, time, and date of capture for the data object.

Curation module 220 may determine the one or more classifications for the data object as anything that could potentially be descriptive of the data object or the contents of the data object. For instance, the one or more classifications could include one or more of one or more persons contained in the data object, one or more animals contained in the data object, one or more objects contained in the data object, one or more events associated with the data object, one or more locations associated with the data object, one or more dates associated with the data object, one or more times associated with the data object, one or more relationships with one or more subjects contained in the data object, and one or more times of year at which the data object was created. Each of the one or more classifications may be either a previously created classification associated with a second data object stored in data store 224 or a newly created classification not associated with any other data object in data store 224.

In addition to the content analysis, curation module 220 may a more subjective analysis on the data objects. For instance, curation module 220 may output one or more requests for subjective feelings of the user regarding the data object, such as the memory questions. Curation module 220 may receive an indication of user input indicative of the subjective feelings of the user regarding the data object. Curation module 220 may store the subjective feelings of the user regarding the data object in data store 224 with the data object and the one or more classifications. Curation module 220 may also update model 226 based on the subjective feelings of the user regarding the data object.

Curation module 220 may also output a request for a narrative descriptive of the data object, where the narrative is a written narrative or an audible narrative. Curation module 220 may receive an indication of user input that includes the narrative for the data object and store the narrative for the data object in data store 224. When the user wishes to relive the memory associated with this data object, output module 222 may output the data object and may also output, substantially simultaneously with the data object (e.g., as a voiceover to a picture or video in the data object), the narrative for the data object.

Any of the above inquiries may be one or more of one or more textual inquiries, one or more audible inquiries, and one or more chatbot inquiries. Output module 222 may output the one or more inquiries, such as via one of output components 246. In creating the one or more inquiries, curation module 220 may create the one or more inquiries for each of the one or more uncertainties using model 226. Curation module 220 may then analyze, using model 226, one or more of the narrative and the answer to each respective inquiry of the one or more inquiries to further classify the respective data object with a feeling for the respective data object. Curation module 220 may group the data object with other data objects that are classified with similar feelings. This may allow curation module 220 to provide memory therapy by presenting one or more data objects that have a same feeling classification.

Curation module 220 may store the data object and the one or more classifications for the data object in data store 224. Curation module 220 may also edit the data object to remove one or more portions of the data object prior to create an edited data object and store the edited data object in data store 224. For instance, in editing the data object, curation module 220 may determine each the one or more portions of the data object to be removed as a portion that includes undesirable content, such as by including no audio or verbal miscues (e.g., "ummm"s).

Data store 224 may include a plurality of data objects, and curation module 220 may store the plurality of data objects in data store 224, where each of the plurality of data objects is stored with one or more classifications for the respective data object. In this manner, data store 224 may naturally group the data objects. Output module 222 may receive an indication of user input indicative of one or more requested classifications. In response to receiving the indication of user input, output module 222 may retrieve, from data store 224, one or more of the plurality of data objects with respective classifications that are equal to the one or more requested classifications. Output module 222 may then output one or more of those data objects in the retrieved group.

Output module 222 may determine favorite memories. Output module 222 may do so by receiving a request to access the data object, outputting the data object, and increasing an access counter for the data object. Output module 222 may later output an interface for accessing a subset of the plurality of data objects, the subset including a number of data objects with a greatest respective access counter.

Output module 222 may define one or more privacy settings for the data object. The one or more privacy settings define access for one or more other users of a social platform over which the data object is shared with the one or more other users. In this social platform, output module 222 may generate a graphical environment including one or more of the plurality of data objects in data store 224. Output module 222 may send the graphical environment to a server device of the social platform with the one or more privacy settings for the graphical environment.

Output module 222 may generate a second graphical environment that includes a second set of one or more of the plurality of data objects. Output module may send the second graphical environment to the server device of the social platform with a second set of one or more privacy settings for the graphical environment. In this way, output module 222 may allow different sets of users access to different memories of the user based on explicit user instructions and privacy settings.

Output module 222 may receive an indication of user input indicative of a requested update to the graphical environment. Output module 222 may generate, based on the requested update to the graphical environment, an updated graphical environment, and send the updated graphical environment to the server device of the social platform. In this way, output module 222 may allow the user to update their graphical environments within the social platform as they so desire.

Users may also use computing device 210 to access the social platform and the memories of other users. Output module 222 may request a friendly graphical environment from the server device, with the friendly graphical environment being one or more data objects associated with a second user different than the user. In response to the server device determining that the user is allowed access to the friendly graphical environment, output module 222 may receive the friendly graphical environment and output the friendly graphical environment. The server device may also deny the user access to this graphical environment if the owner of the graphical environment has not granted the user access.

The graphical environment includes a particular arrangement of the one or more of the plurality of data objects. The graphical environment may be one or more of a flat graphical user interface containing the particular arrangement, a virtual reality user interface containing the particular arrangement, an augmented reality user interface containing the particular arrangement, an audio user interface containing the particular arrangement, and an extended reality user interface containing the particular arrangement.

Curation module 220 may also generate, based on the model, an artificial intelligence profile that includes one or more of vocal characteristics of the user, relationships for the user, personal information for the user, likes for the user, dislikes for the user, visual characteristics for the user, experiences of the user, and any other defining characteristic for the user. Output module 222 may then generate a computerized avatar that acts in accordance with the artificial intelligence profile. Output module 222 may include the computerized avatar in the graphical environment. This computerized avatar may be configured to interact with one or more other users of the social media platform in the graphical environment of the user.

Curation module 220 may also define a longevity setting comprising a permission or denial of permission for the computer device to allow access to one or more aspects of the storage component after the user passes away. Output module 222 or a server device may use these longevity settings to control access to the user's memories after the user passes away.

Curation module 220 may remove personally identifiable information from one or more objects in data store 224 to generate a set of anonymous information. Curation module 220 may send the set of anonymous information to the server device to be used for training a universal machine learning model. By removing the personally identifiable information, computing device 210 may contribute to a powerful, universal AI model without compromising the user's personal data.

In some instances, computing device 210 is a standalone computing device that includes data store 224 locally. In other instances, data store 224 may be a cloud storage component that computing device 210 accesses via a network. In storing the data object, curation module 220 may create a reference to the data object in a blockchain.

In addition to storing the data objects in a blockchain, computing device 210 may utilize non-fungible token (NFT) technology and the blockchain to authenticate data objects in the blockchain or in data store 224. In this way, curation module 220 may attach an NFT to a data object to be used in authenticating that data object to protect computing device 210 from being hacked or otherwise altered.

An NFT is a unit of data on a digital ledger of the blockchain associated with the NFT. The NFT represents a unique digital file, such as a picture, a video, an audio clip, or any other digital file (e.g., items in a video game). While copies of the file represented by the NFT may exist, the NFT is a singular object attached only to the original data object in the blockchain, granting the holder of the NFT ownership of that data object. In this way, NFTs may validate the data objects for computing device 210. These NFTs may also be connected to cryptocurrency held in an account of the user, so long as the cryptocurrency uses a blockchain that allows NFTs to be attached.

In examples where the NFTs may be attached to the data objects, the social platform described above may turn into a marketplace. Rather than simply viewing or listening to the media stored in the data objects within the graphical environment constructed by the user and/or curation module 220, other users may now rent, sell, share, or download authenticated data objects from the original user, with proceeds from those marketplace transactions entering the original user's account.

Curation module 220 may also receive one or more user death directives. Curation module 220 may receive an indication of user input that completes one of the one or more user death directives. In response to receiving this indication, curation module 220 may issue a user-defined reward to the user that completed the one of the one or more user death directives. This may include gifting computing device 210 as a legacy gift to a trustee.

One example of using death directives may be in creating and utilizing a budget. For instance, curation module 220 may establish an account for the user that includes some form of currency, such as pre-deposited dollars or cryptocurrency established through blockchain. This may provide funding to continue preserving data store 224, model 226, and any computerized avatars or DNA stored on computing device 210. The longevity settings may define a set of rules for the user's human caretake or trustee in spending those funds to preserve, or even improve data store 224, model 226, and any computerized avatars or DNA stored on computing device 210.

For instance, so long as there remains currency in the form of real money or cryptocurrency in the account, a combination of the artificial intelligence created from model 226 and the trustee may be able to determine how those funds are spent, with curation module 220 utilizing model 226 to even recommend purchases. The death directives may indicate that the user wishes to continue upgrading the processor to have the fastest speed and optimal performance, while not caring about the computerized avatar. As such, model 226 may influence curation module 220 to recommend a new processor, to be purchased using funds in the account, to the trustee, who can approve the purchase. Similarly, if the trustee wishes to spend the funds on an improved display device for playing the data objects stored in data store 226, curation module 220 and model 226 may restrict the trustee from making that purchase based on the death directives.

Ultimately, a feedback loop is created where the artificial intelligence of model 226 and the trustee work together to continually improve computing device 210 and the products generated by computing device 210 in the way ultimately desired by the initial user. Model 226 can be updated to discover new technology that is being developed, either in hardware or software (including optimizations or improvements to the computerized avatar creation process), and make recommendations to the trustee when those new products are in line with the death directives of the user. To assist with those purchases, a physical charge card may be incorporated into computing device 210, which can be removed from computing device 210 when a purchase has been approved by both model 226 and the trustee, where funds spent on that charge card are taken from the account of pre-deposited real dollars or cryptocurrency. Furthermore, rewards may be granted to the trustee from the account should the trustee follow the death directives and the recommendations of model 226.

Storage components 248 may further include a physical storage component for storing a physical specimen of the user's DNA. For instance, either a live physical specimen or a dried physical specimen may be placed in a specialized compartment configured to maintain the correct environment for the preservation of the DNA specimen. For instance, in the case of a live physical specimen, the compartment may be cooled or insulated such that the live physical specimen remains live. In the case of a dried physical specimen, foam inserts may be placed in the compartment to ensure that the specimen does not break. In this way, computing device 210 may provide model 226, the computerized avatar, and the user's actual DNA for potentially creating additional forms of life in line with modern technology at that time.

Figure 3:
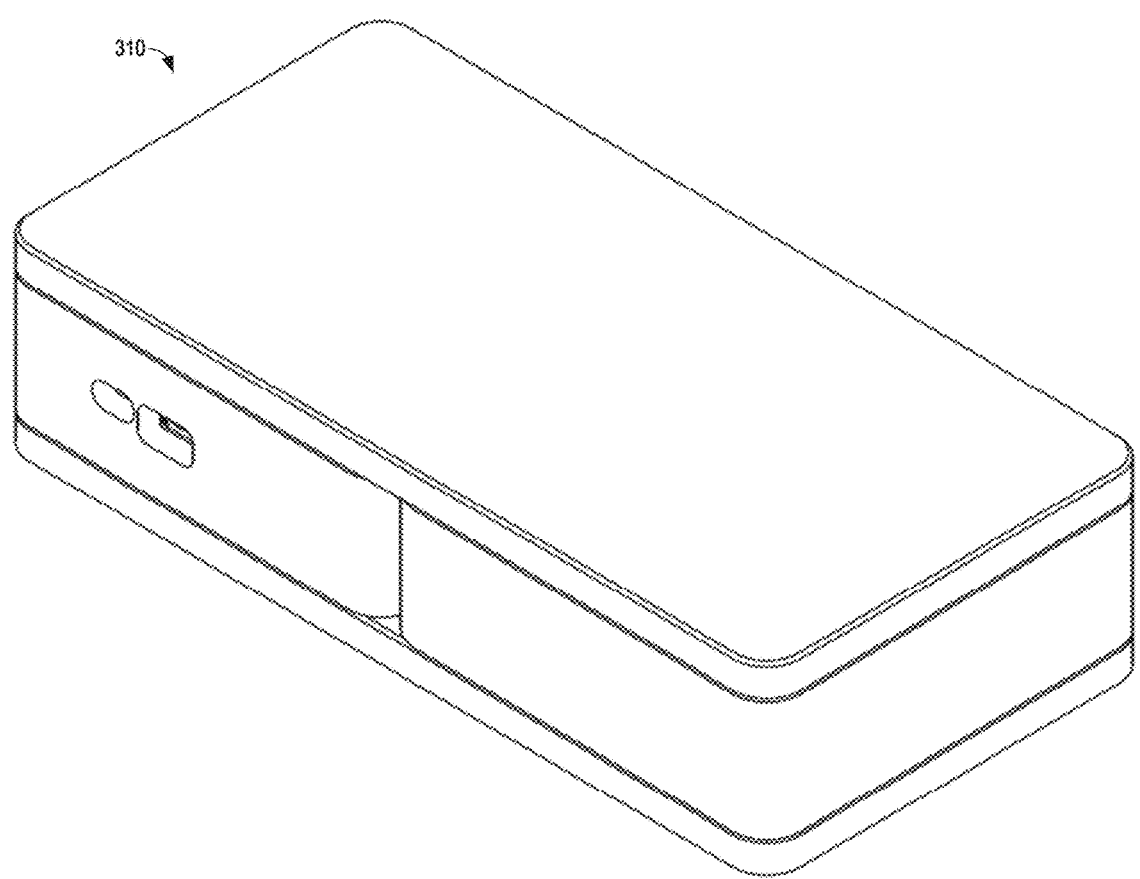
FIG. 3 is a conceptual diagram showing a top-front perspective view of an example computing device configured to perform the techniques described herein.

FIG. 3 is a conceptual diagram showing a top-front perspective view of an example computing device 310 configured to perform the techniques described herein. Computing device 310 may be similar to and may perform the functions of computing device 110 of FIG. 1 or computing device 210 of FIG. 2. While FIG. 3 shows a specific example of a computing device that may perform the techniques of this disclosure, computing device 310 is merely an example and is not meant to be limiting as to the physical look of computing device 310. Any computing device that may be configured to perform the techniques of this disclosure may be an example of computing device 310.

Figure 4:
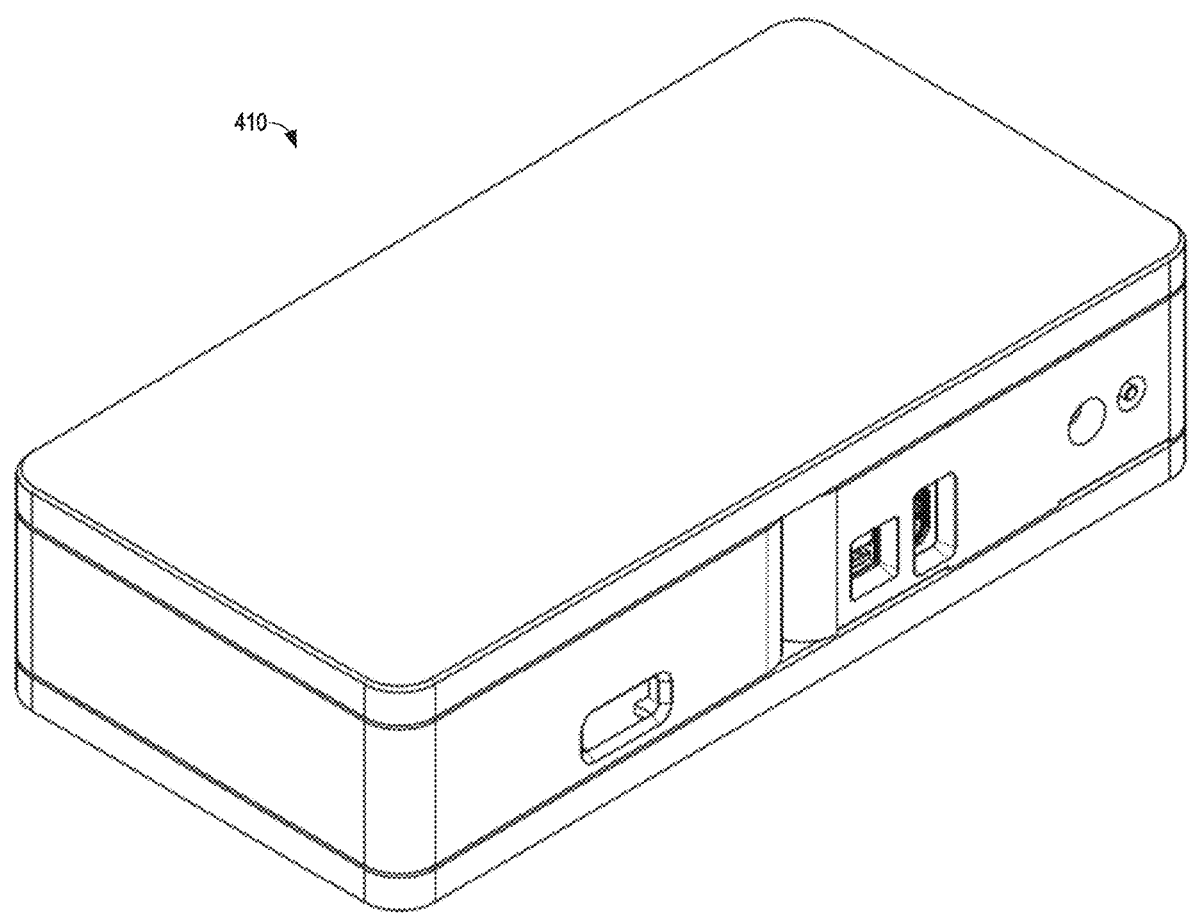
FIG. 4 is a conceptual diagram showing a top-rear perspective view of an example computing device configured to perform the techniques described herein.

FIG. 4 is a conceptual diagram showing a top-rear perspective view of an example computing device 410 configured to perform the techniques described herein. Computing device 410 may be similar to and may perform the functions of computing device 110 of FIG. 1 or computing device 210 of FIG. 2. While FIG. 4 shows a specific example of a computing device that may perform the techniques of this disclosure, computing device 410 is merely an example and is not meant to be limiting as to the physical look of computing device 410. Any computing device that may be configured to perform the techniques of this disclosure may be an example of computing device 410.

The examples of FIGS. 3 and 4 show multiple I/O ports that may be used for any numbers of purposes. However, in other instances, the computing device may instead only have a single physical port, which is used to supply power to the computing device. Rather, in order to transfer data objects to and from the computing device, a user may access an application on a mobile device or a different computing device and wirelessly connect to the computing device described throughout this disclosure. The API provided by the application may connect the computing device with the other user device, and data objects may be transferred to and from the computing device through that application and the API. This removes the need to include any additional ports into the computing device other than the port to power the computing device, adding to the security, stability, and longevity of the computing device.

Figure 5:
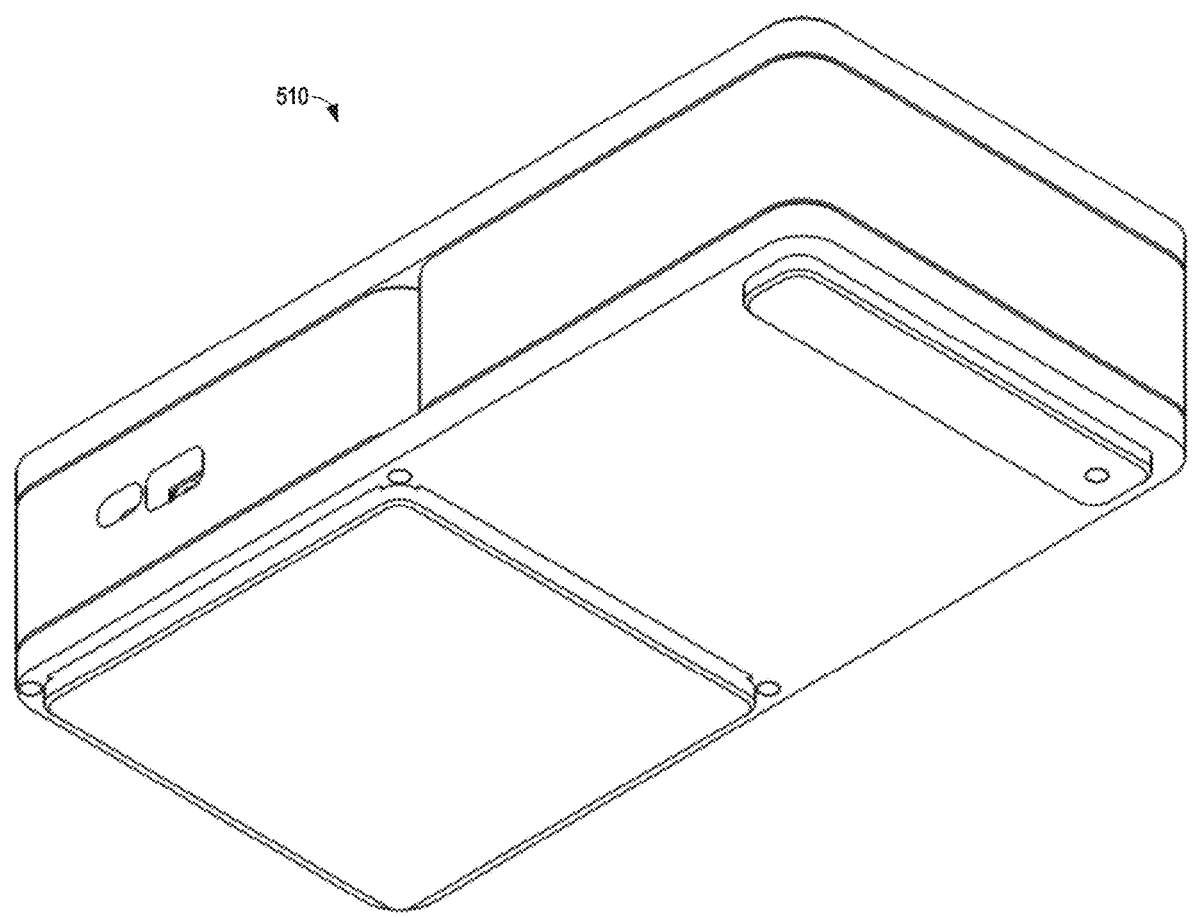
FIG. 5 is a conceptual diagram showing a bottom-front perspective view of an example computing device configured to perform the techniques described herein.

FIG. 5 is a conceptual diagram showing a bottom-front perspective view of an example computing device 510 configured to perform the techniques described herein. Computing device 510 may be similar to and may perform the functions of computing device 110 of FIG. 1 or computing device 210 of FIG. 2. While FIG. 5 shows a specific example of a computing device that may perform the techniques of this disclosure, computing device 510 is merely an example and is not meant to be limiting as to the physical look of computing device 510. Any computing device that may be configured to perform the techniques of this disclosure may be an example of computing device 510.

Figure 6:
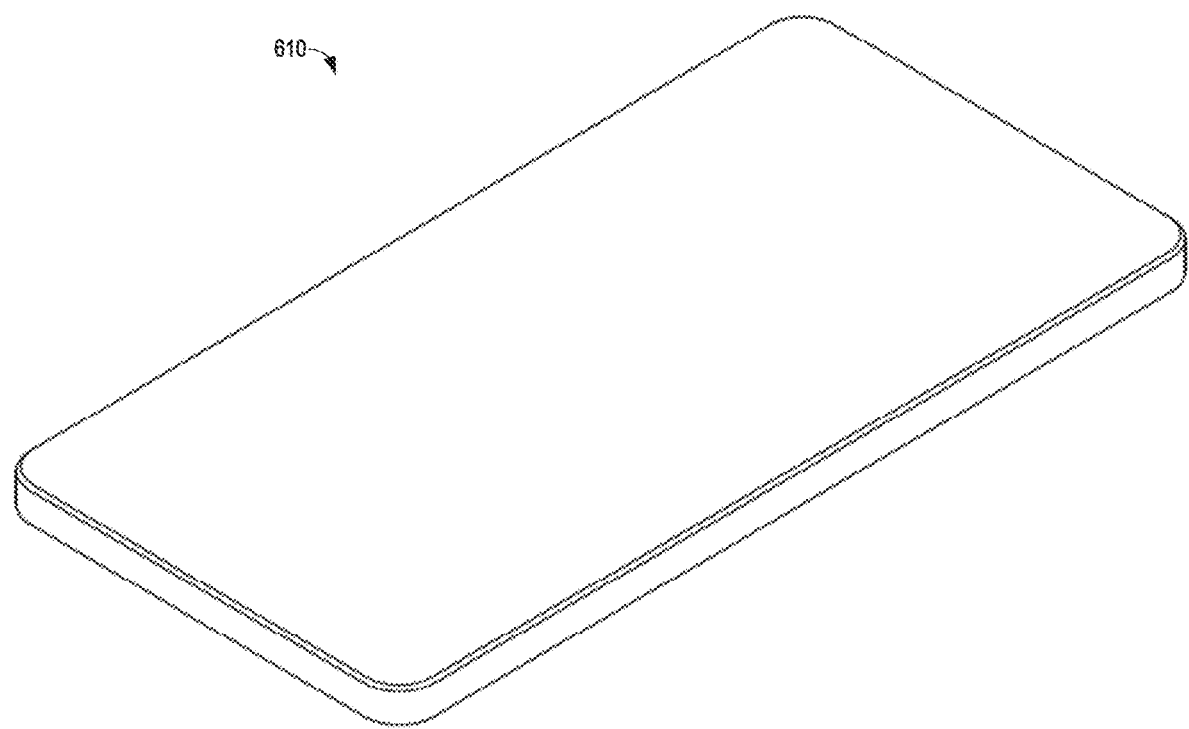
FIG. 6 is a conceptual diagram showing a top-front perspective view of a top portion of an example computing device configured to perform the techniques described herein.

FIG. 6 is a conceptual diagram showing a top-front perspective view of a top portion 610 of an example computing device configured to perform the techniques described herein. While FIG. 6 shows a specific example of a top portion of a computing device that may perform the techniques of this disclosure, top portion 610 is merely an example and is not meant to be limiting as to the physical look of top portion 610. Any computing device that may be configured to perform the techniques of this disclosure may be used to perform the techniques of this disclosure, and a top portion of that computing device may be configured differently, or not even present at all.

Figure 7:
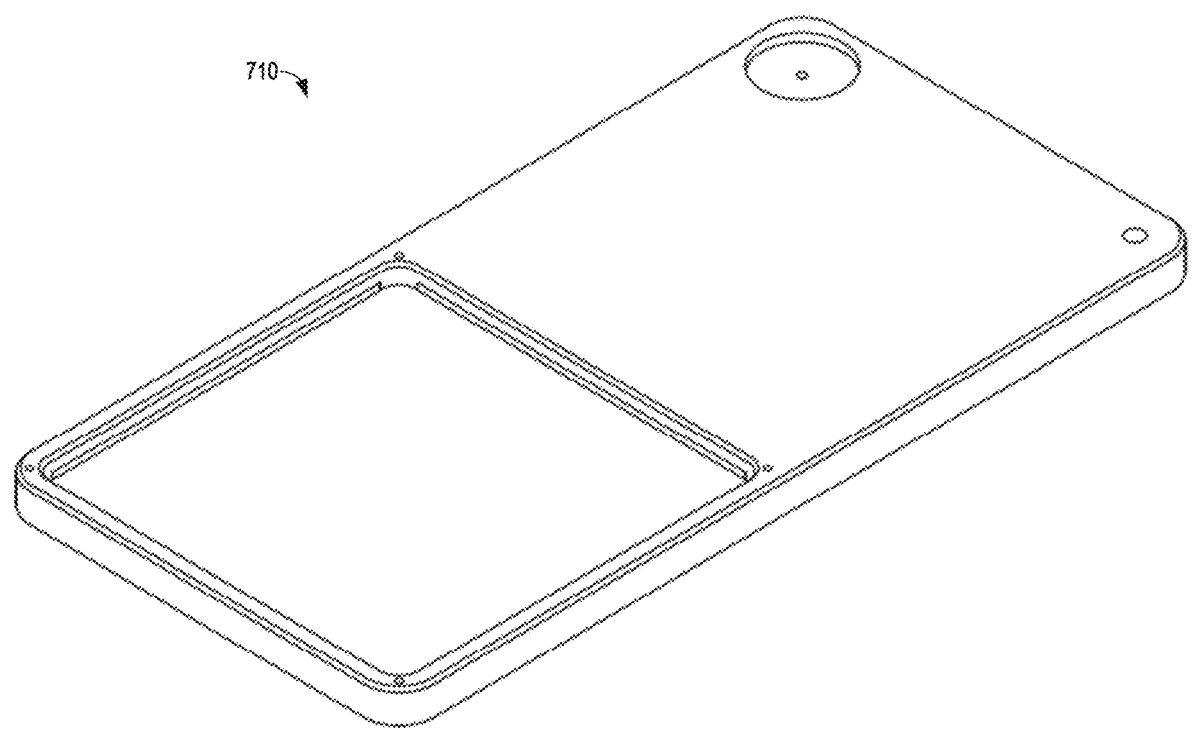
FIG. 7 is a conceptual diagram showing a top-front perspective view of a bottom portion of an example computing device configured to perform the techniques described herein.

FIG. 7 is a conceptual diagram showing a top-front perspective view of a bottom portion 710 of an example computing device configured to perform the techniques described herein. While FIG. 7 shows a specific example of a bottom portion of a computing device that may perform the techniques of this disclosure, bottom portion 710 is merely an example and is not meant to be limiting as to the physical look of bottom portion 710. Any computing device that may be configured to perform the techniques of this disclosure may be used to perform the techniques of this disclosure, and a bottom portion of that computing device may be configured differently, or not even present at all.

Figure 8:
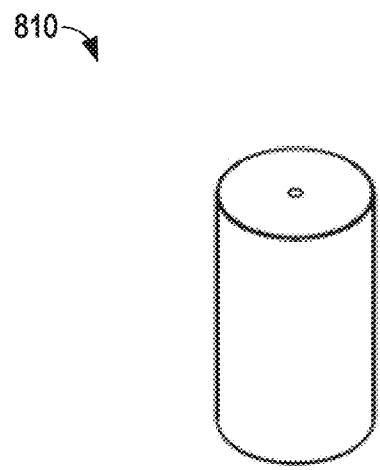
FIG. 8 is a conceptual diagram showing a perspective view of a pivot cylinder used in an example computing device configured to perform the techniques described herein.

FIG. 8 is a conceptual diagram showing a perspective view of a pivot cylinder 810 used in an example computing device configured to perform the techniques described herein. While FIG. 8 shows a specific example of a pivot cylinder used in a computing device that may perform the techniques of this disclosure, pivot cylinder 810 is merely an example and is not meant to be limiting as to the physical look of pivot cylinder 810. Any computing device that may be configured to perform the techniques of this disclosure may be used to perform the techniques of this disclosure, and a pivot cylinder of that computing device may be configured differently, or not even present at all.

Figure 9:
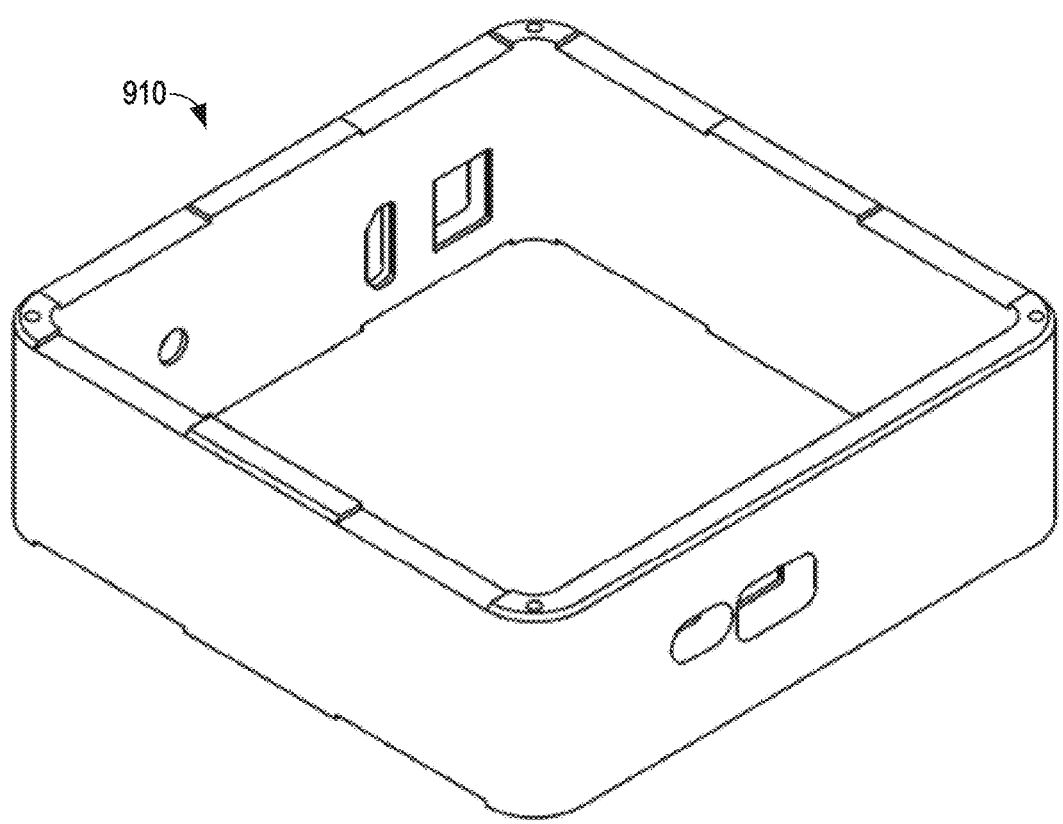
FIG. 9 is a conceptual diagram showing a top-front perspective view of a single-board computer (SBC) enclosure in an example computing device configured to perform the techniques described herein.

FIG. 9 is a conceptual diagram showing a top-front perspective view of a single-board computer (SBC) enclosure 910 in an example computing device configured to perform the techniques described herein. While FIG. 9 shows a specific example of an SBC enclosure of a computing device that may perform the techniques of this disclosure, SBC enclosure 910 is merely an example and is not meant to be limiting as to the physical look of SBC enclosure 910. Any computing device that may be configured to perform the techniques of this disclosure may be used to perform the techniques of this disclosure, and an SBC enclosure of that computing device may be configured differently, or not even present at all.

Figure 10:
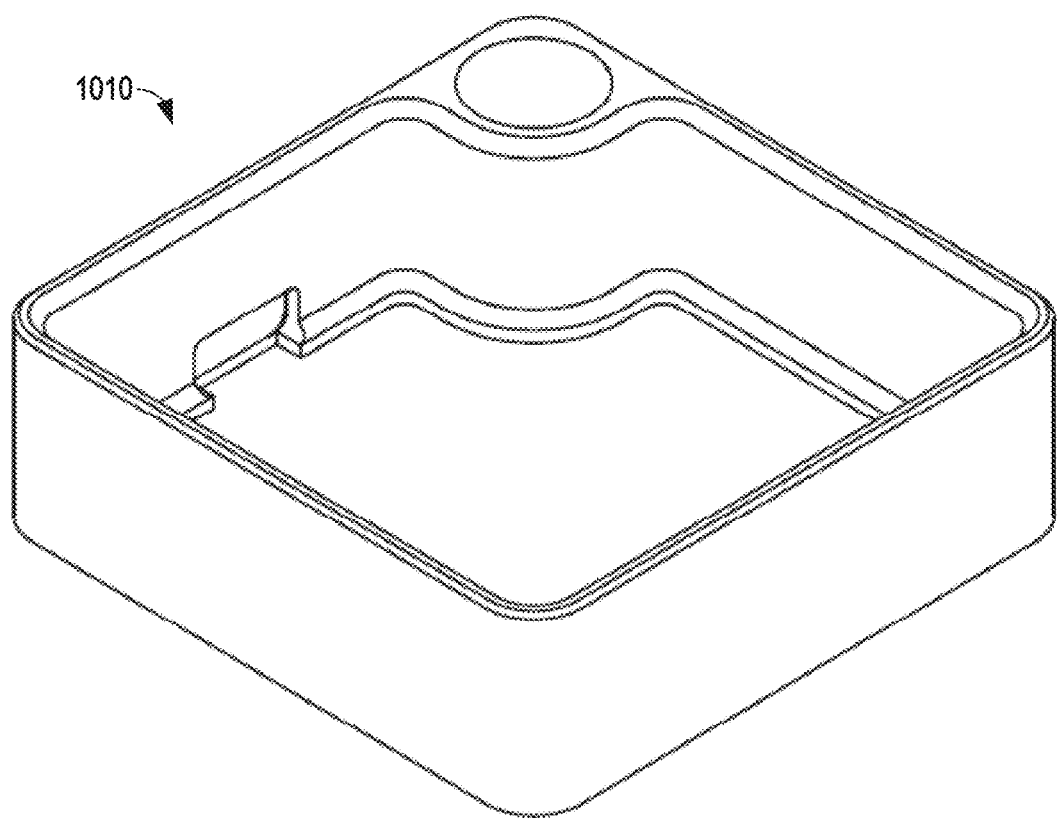
FIG. 10 is a conceptual diagram showing a top-front perspective view of a pivot drawer in an example computing device configured to perform the techniques described herein.

FIG. 10 is a conceptual diagram showing a top-front perspective view of a pivot drawer 1010 in an example computing device configured to perform the techniques described herein. While FIG. 10 shows a specific example of a pivot drawer of a computing device that may perform the techniques of this disclosure, pivot drawer 1010 is merely an example and is not meant to be limiting as to the physical look of pivot drawer 1010. Any computing device that may be configured to perform the techniques of this disclosure may be used to perform the techniques of this disclosure, and a pivot drawer of that computing device may be configured differently, or not even present at all.

Figure 11:
FIG. 11 is a conceptual diagram showing a top-front perspective view of an on/off button in an example computing device configured to perform the techniques described herein.

FIG. 11 is a conceptual diagram showing a top-front perspective view of an on/off button 1110 in an example computing device configured to perform the techniques described herein. While FIG. 10 shows a specific example of an on/off button of a computing device that may perform the techniques of this disclosure, on/off button 1110 is merely an example and is not meant to be limiting as to the physical look of on/off button 1110. Any computing device that may be configured to perform the techniques of this disclosure may be used to perform the techniques of this disclosure, and an on/off button of that computing device may be configured differently, or not even present at all.

Figure 12:
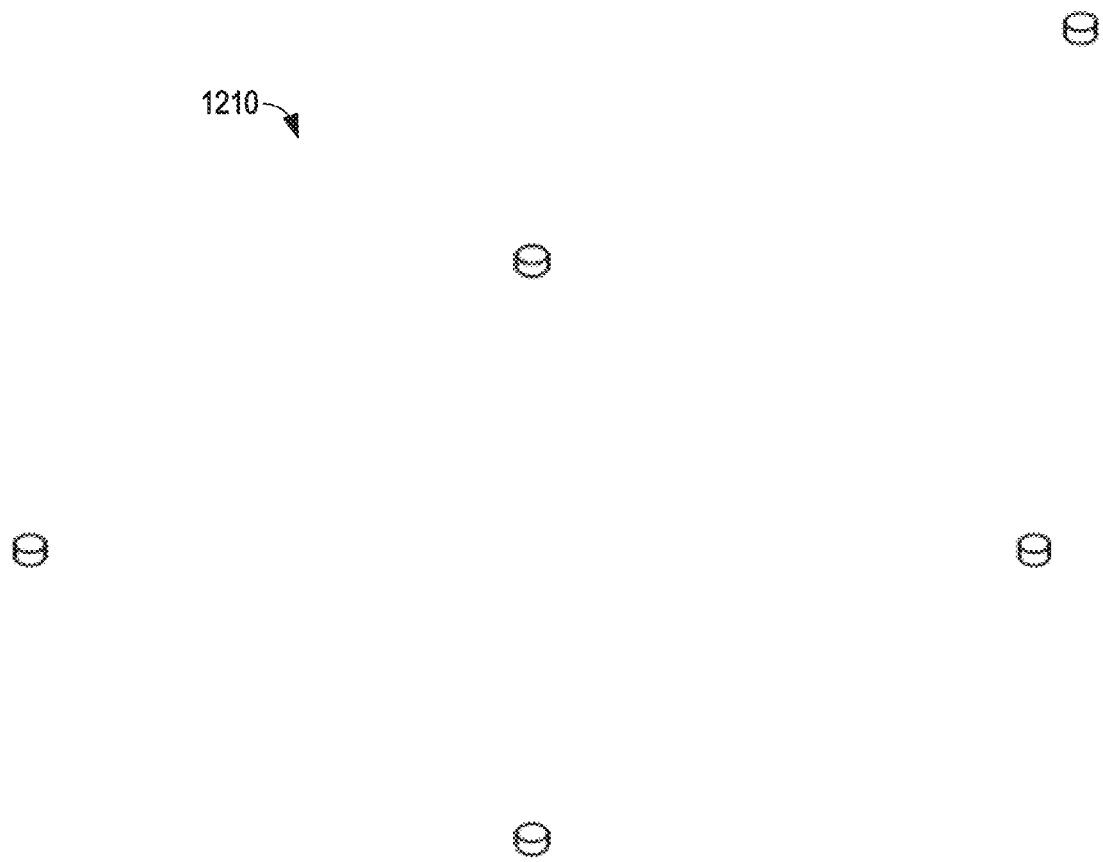
FIG. 12 is a conceptual diagram showing a top-front perspective view of a plurality of screw plugs in an example computing device configured to perform the techniques described herein.

FIG. 12 is a conceptual diagram showing a top-front perspective view of a plurality of screw plugs 1210 in an example computing device configured to perform the techniques described herein. While FIG. 12 shows a specific example of screw plugs of a computing device that may perform the techniques of this disclosure, screw plugs 1210 is merely an example and is not meant to be limiting as to the physical look of screw plugs 1210. Any computing device that may be configured to perform the techniques of this disclosure may be used to perform the techniques of this disclosure, and screw plugs of that computing device may be configured differently, or not even present at all.

Figure 13:
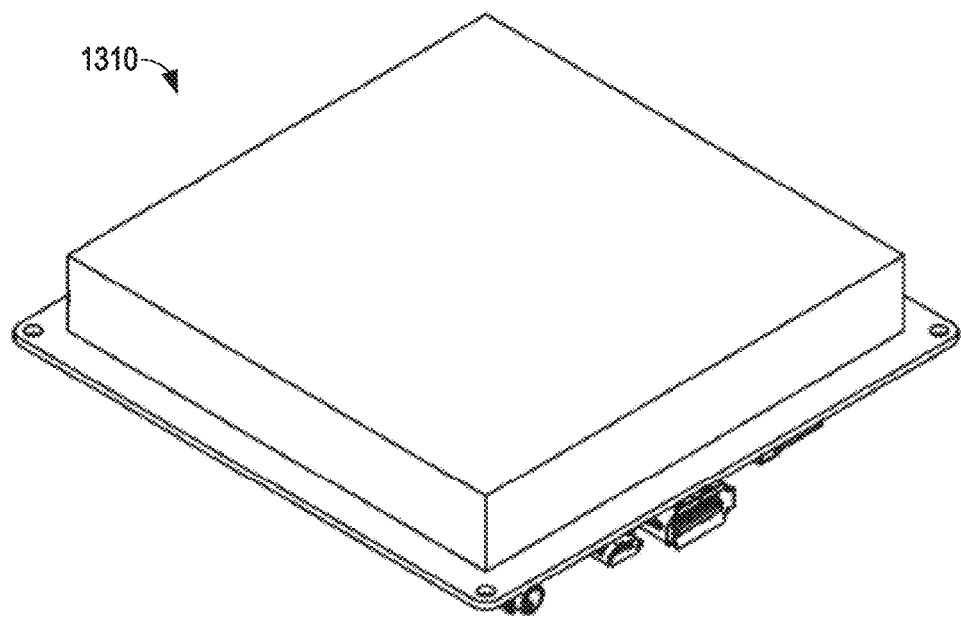
FIG. 13 is a conceptual diagram showing a top-front perspective view of an SBC computer in an example computing device configured to perform the techniques described herein.

FIG. 13 is a conceptual diagram showing a top-front perspective view of an SBC computer 1310 in an example computing device configured to perform the techniques described herein. While FIG. 13 shows a specific example of an SBC computer of a computing device that may perform the techniques of this disclosure, SBC computer 1310 is merely an example and is not meant to be limiting as to the physical look of SBC computer 1310. Any computing device that may be configured to perform the techniques of this disclosure may be used to perform the techniques of this disclosure, and an SBC computer of that computing device may be configured differently, or not even present at all.

Figure 14:
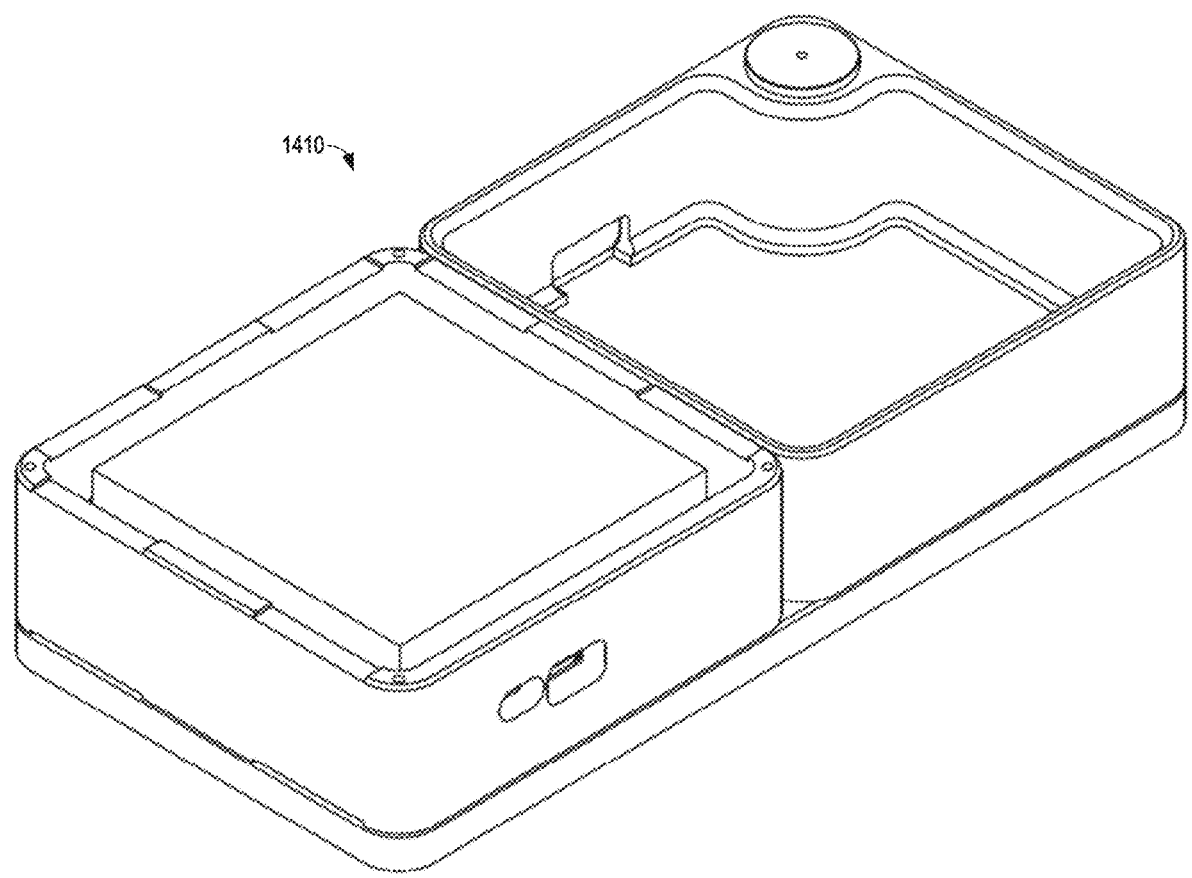
FIG. 14 is a conceptual diagram showing a top-front perspective view of an example computing device without a top portion, the computing device configured to perform the techniques described herein.

FIG. 14 is a conceptual diagram showing a top-front perspective view of an example computing device 1410 without a top portion, the computing device configured to perform the techniques described herein. Computing device 1410 may be similar to and may perform the functions of computing device 110 of FIG. 1 or computing device 210 of FIG. 2. While FIG. 14 shows a specific example of a computing device that may perform the techniques of this disclosure, computing device 1410 is merely an example and is not meant to be limiting as to the physical look of computing device 1410. Any computing device that may be configured to perform the techniques of this disclosure may be an example of computing device 1410.

Figure 15:
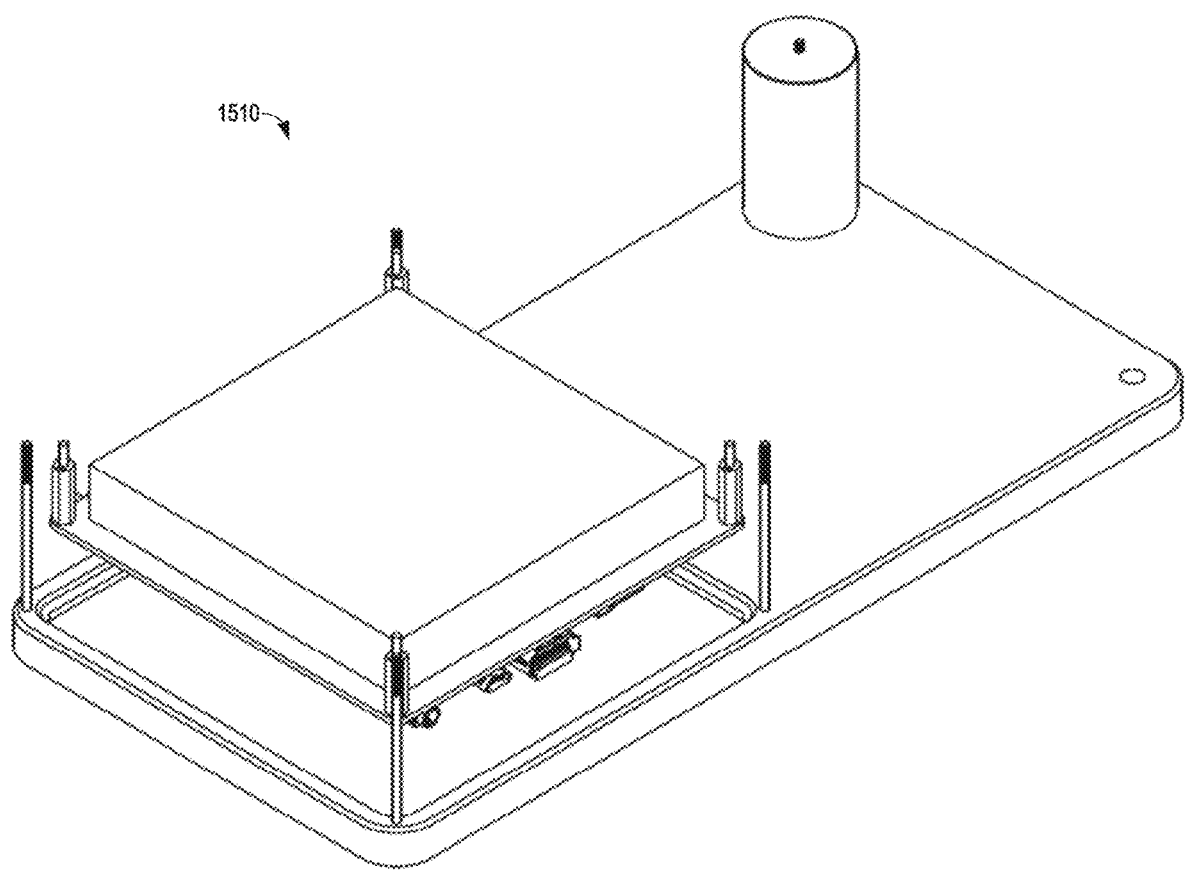
FIG. 15 is a conceptual diagram showing a top-front perspective view of an example computing device without a top portion, a drawer, or an SBC enclosure, the computing device configured to perform the techniques described herein.

FIG. 15 is a conceptual diagram showing a top-front perspective view of an example computing device 1510 without a top portion, a drawer, or an SBC enclosure, the computing device configured to perform the techniques described herein. Computing device 1510 may be similar to and may perform the functions of computing device 110 of FIG. 1 or computing device 210 of FIG. 2. While FIG. 15 shows a specific example of a computing device that may perform the techniques of this disclosure, computing device 1510 is merely an example and is not meant to be limiting as to the physical look of computing device 1510. Any computing device that may be configured to perform the techniques of this disclosure may be an example of computing device 1510.

Figure 16:
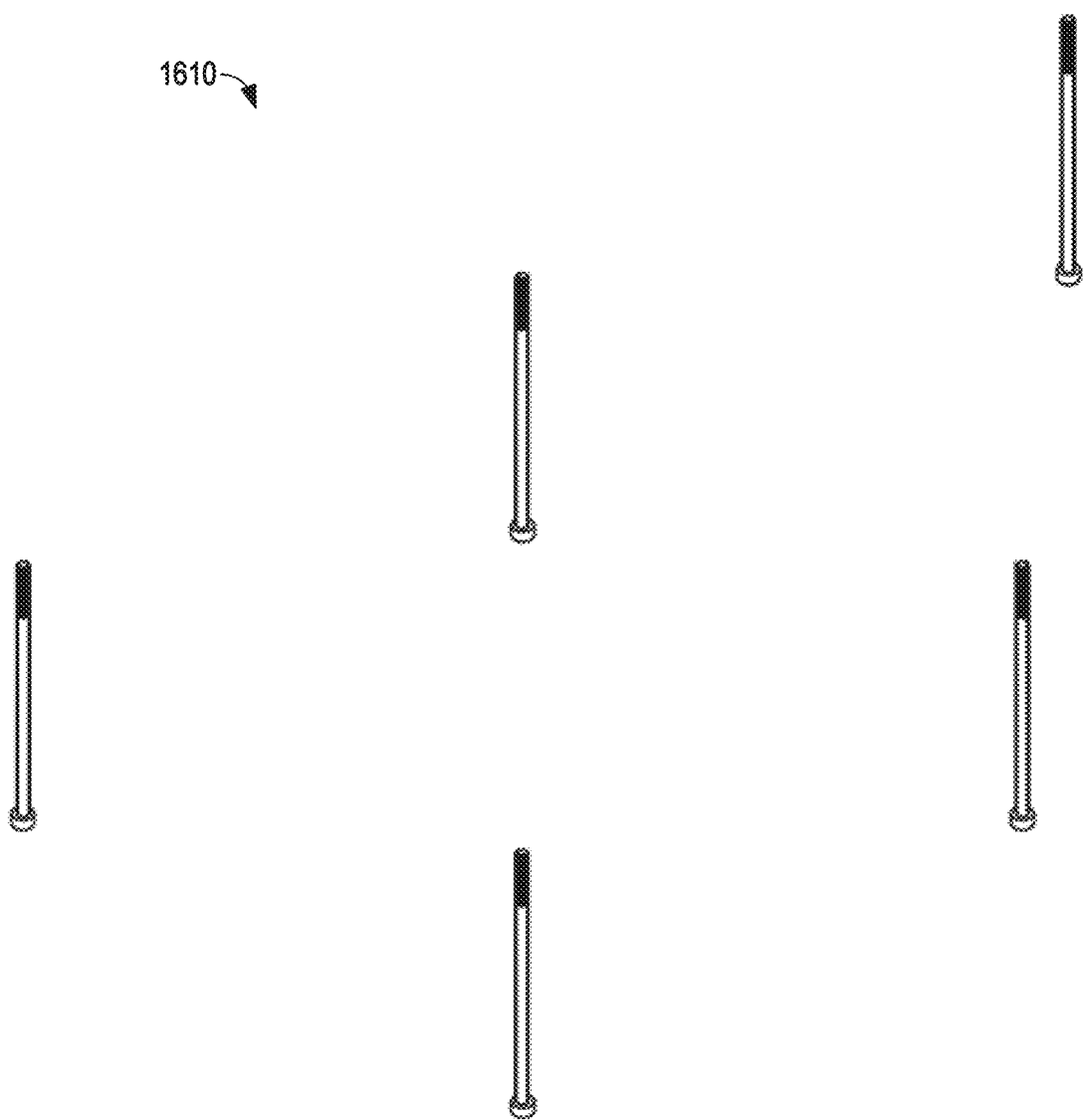
FIG. 16 is a conceptual diagram showing a top-front perspective view of a plurality of hex screws for an example computing device configured to perform the techniques described herein.

FIG. 16 is a conceptual diagram showing a top-front perspective view of a plurality of hex screws 1610 for an example computing device configured to perform the techniques described herein. While FIG. 16 shows a specific example of hex screws of a computing device that may perform the techniques of this disclosure, hex screws 1610 is merely an example and is not meant to be limiting as to the physical look of hex screws 1610. Any computing device that may be configured to perform the techniques of this disclosure may be used to perform the techniques of this disclosure, and hex screws of that computing device may be configured differently, or not even present at all.

Figure 17:
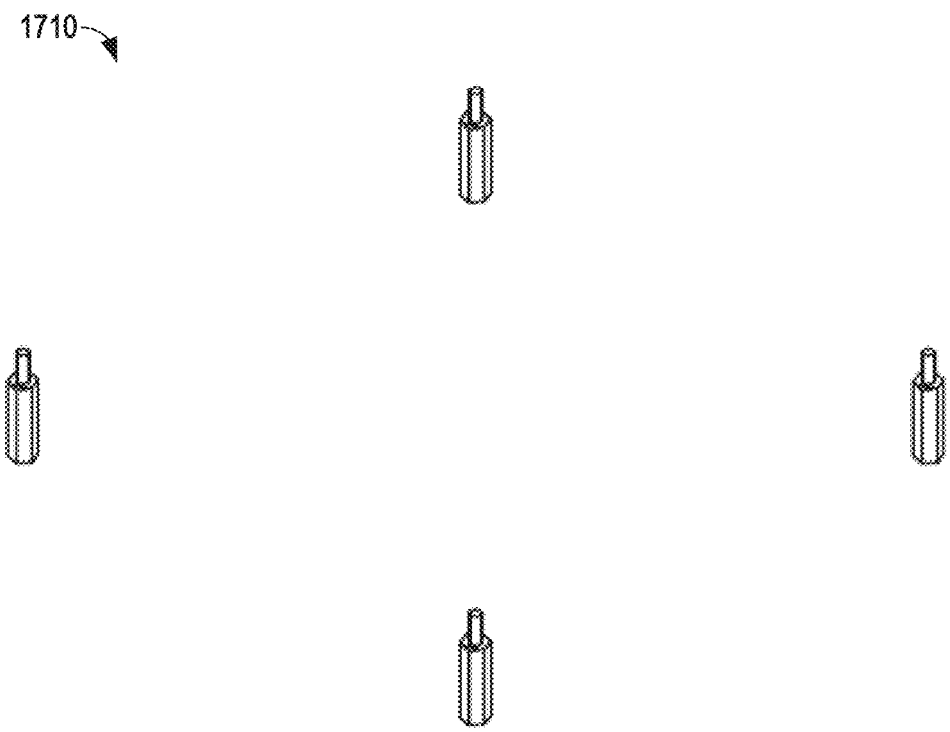
FIG. 17 is a conceptual diagram showing a top-front perspective view of a plurality of SBC standoffs in an example computing device configured to perform the techniques described herein.

FIG. 17 is a conceptual diagram showing a top-front perspective view of a plurality of SBC standoffs 1710 in an example computing device configured to perform the techniques described herein. While FIG. 17 shows a specific example of SBC standoffs of a computing device that may perform the techniques of this disclosure, SBC standoffs 1710 is merely an example and is not meant to be limiting as to the physical look of SBC standoffs 1710. Any computing device that may be configured to perform the techniques of this disclosure may be used to perform the techniques of this disclosure, and SBC standoffs of that computing device may be configured differently, or not even present at all.

Figure 18:
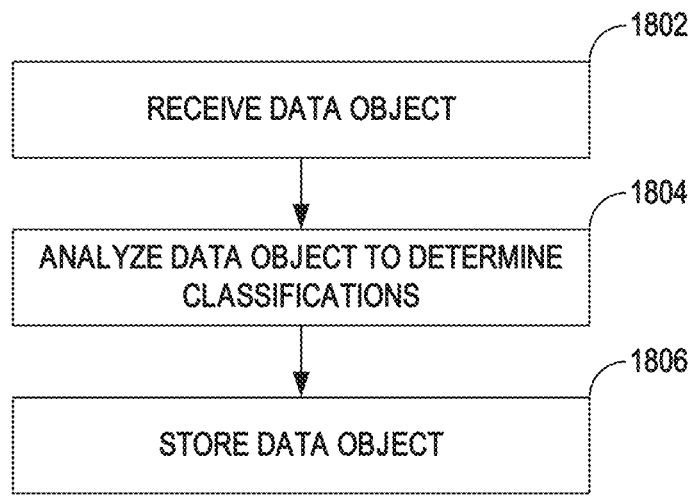
FIG. 18 is a flow diagram illustrating an example technique of this disclosure.

FIG. 18 is a flow diagram illustrating an example technique of this disclosure. The techniques of FIG. 18 may be performed by one or more processors of a computing device, such as computing device 110 of FIG. 1 and/or computing device 210 illustrated in FIG. 2. For purposes of illustration only, the techniques of FIG. 18 are described within the context of computing device 210 of FIG. 2, although computing devices having configurations different than that of computing device 210 may perform the techniques of FIG. 18.

In accordance with one or more techniques of this disclosure, curation module 220 receives a data object (1802). Curation module 220 analyzes, using model 226, the data object to determine one or more classifications for the data object (1804). Curation module 220 stores the data object and the one or more classifications for the data object in storage component 248 of computing device 210, such as in data store 224 (1806).

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

Figure 19:
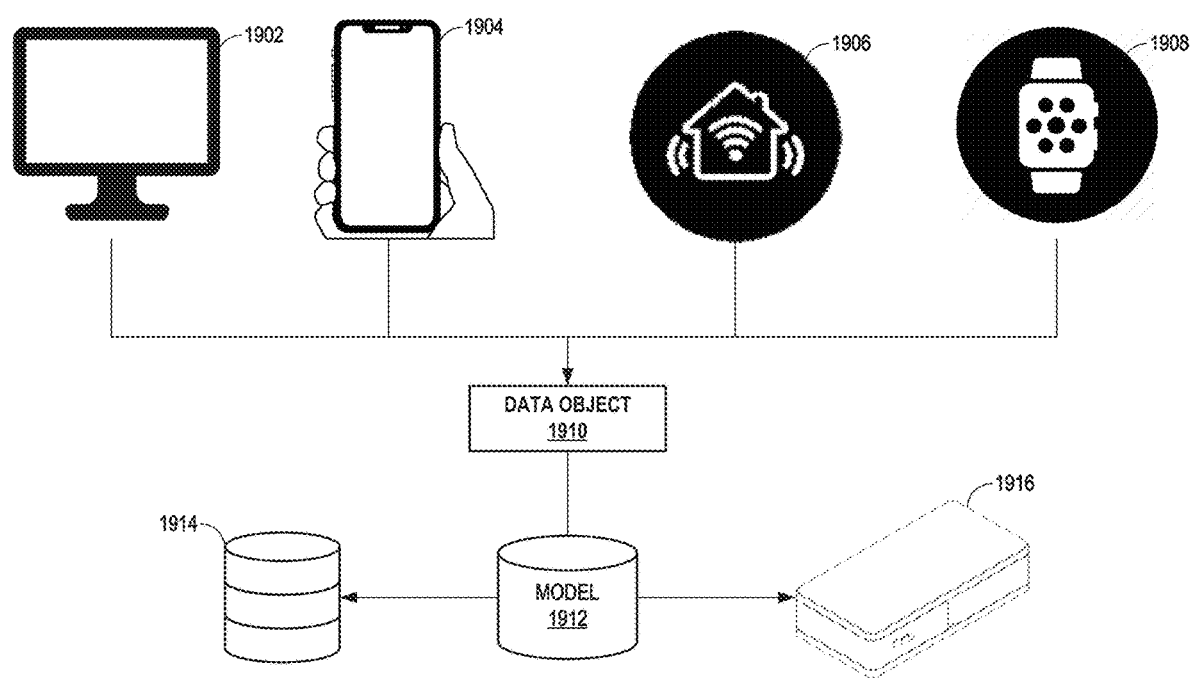
FIG. 19 is a conceptual diagram illustrating an example technique of this disclosure.

FIG. 19 is a conceptual diagram illustrating an example technique of this disclosure. In the example of FIG. 19, data object 1910 may be captured by or initially stored on one of computing device 1902, smartphone 1904, internet of things device 1906, or wearable device 1908. Computing device 1902 may be any desktop, laptop, or tablet computer that is configured to capture, store, and/or transmit data objects to a different computing device. Smartphone 1904 may be any mobile device configured to capture, store, and/or transmit data objects to a different computing device. Internet of things device 1906 may be any smart home device or other computing device that is capable of connecting to the internet and configured to capture, store, and/or transmit data objects to a different computing device. Wearable device 1908 may be any smart watch, smart eyewear, or any other computing device capable of being worn on the body of a user and is also configured to capture, store, and/or transmit data objects to a different computing device.

Any one of computing device 1902, smartphone 1904, internet of things device 1906, or wearable device 1908 may capture, or otherwise store, data object 1910. Data object 1910 may be any one or more of a picture, a video, a document, an audio file, or any other file that could be associated with a memory of some kind. Using a designated application on the respective device or a website, computing device 1902, smartphone 1904, internet of things device 1906, and/or wearable device 1908 may transmit data object 1910 to one of server device 1914 or standalone computing device 1916. Both of server device 1914 and standalone computing device 1916 are examples of computing device 210 of FIG. 2, and may perform similar functions as computing device 210 of FIG. 2. For instance, model 1912, which may be stored on either server device 1914 or standalone computing device 1916, may be used to process data object 1910 to curate data object 1910 by determining one or more classifications for data object 1910. One or more of server device 1914 and standalone computing device 1916 may store data object 1910 along with the one or more classifications.

Figure 20:
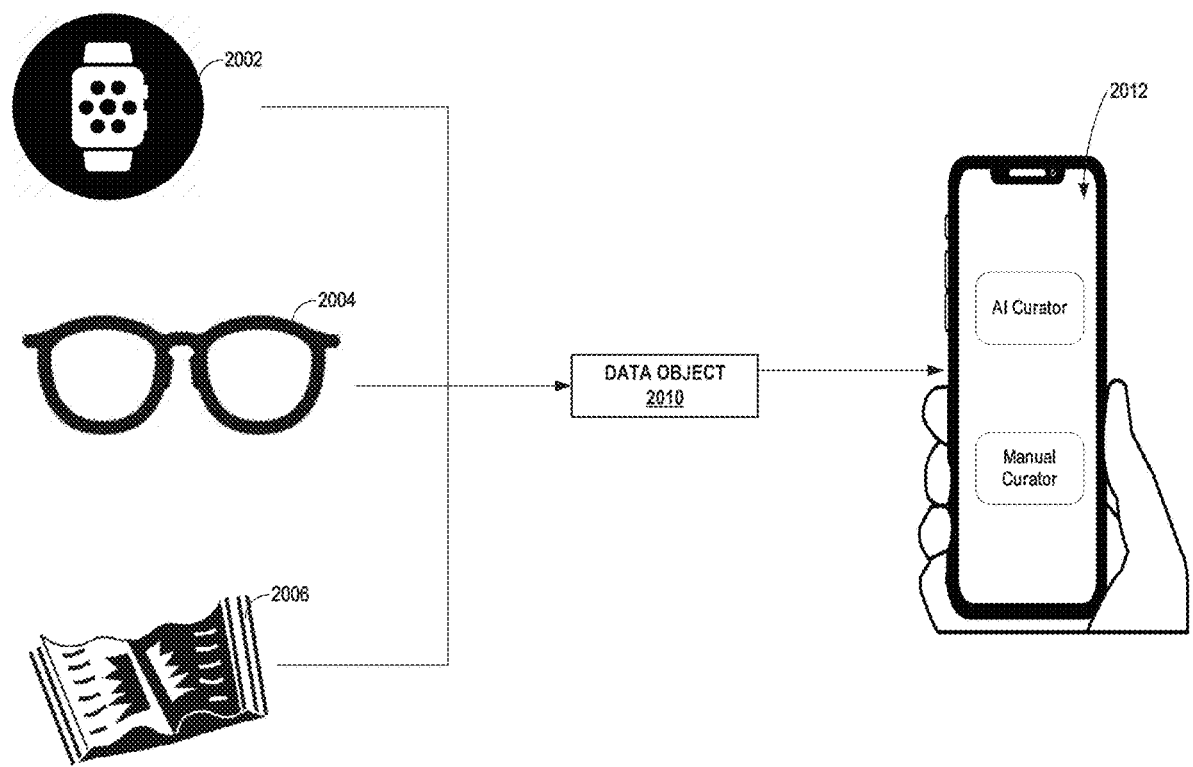
FIG. 20 is a conceptual diagram illustrating an example technique of this disclosure.

FIG. 20 is a conceptual diagram illustrating an example technique of this disclosure. In the example of FIG. 20, one of smartwatch 2002 or smart eyewear 2004 may capture, with an integrated camera, data object 2010 and transmit data object 2012 to smartphone 2012. In other instance, smartphone 2012 itself, or some other computing device with an integrated camera, may capture data object 2010. In still other instances of FIG. 20, album 2006, which may be either a digital or analog photo or video album, may transmit data object 2010 to smartphone 2012. Data object 2010 may be any one or more of a picture, a video, a document, an audio file, or any other file that could be associated with a memory of some kind. Smartphone 2012 may execute an application to be used to curate data object 2010 by determining one or more classifications for data object 2010. In some instances, the "AI Curator" option may be selected, which will cause smartphone 2012 to use a model, such as model 226 of FIG. 2, to automatically utilize artificial intelligence to curate data object 2010. In other instances, the "Manual Curator" option may be selected, which will cause smartphone 2012 to output a prompt for the user to add manual classifications or tags to associate with data object 2010. While shown as a smartphone, this application could be executed by any computing device, such as computing device 210 of FIG. 2.

Figure 21:
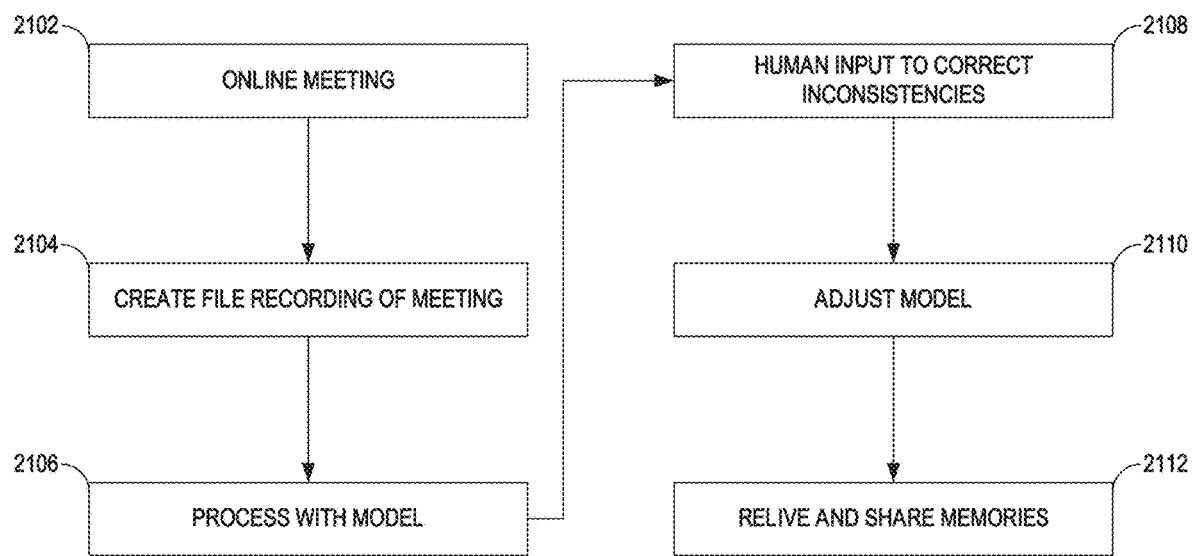
FIG. 21 is a flow diagram illustrating an example technique of this disclosure.

FIG. 21 is a flow diagram illustrating an example technique of this disclosure. The techniques of FIG. 21 may be performed by one or more processors of a computing device, such as computing device 110 of FIG. 1 and/or computing device 210 illustrated in FIG. 2. For purposes of illustration only, the techniques of FIG. 21 are described within the context of computing device 210 of FIG. 2, although computing devices having configurations different than that of computing device 210 may perform the techniques of FIG. 21.

In accordance with the techniques of this disclosure, a user may participate in an online meeting with one or more other users (2102). The computing device being used for the online meeting, which may be computing device 210, may record the meeting to create a file or data object that contains either a video of the meeting, an audio recording of the meeting, or a photo of the participants of the meeting (2104). Curation module 220 may process the data object with model 226 to create one or more classifications for the data object (2106). The user may additionally input any tags or classifications, or correct the one or more created classifications, to correct any inconsistencies present after the analysis by curation module 220 (2108). Curation module may adjust model 226 based on this human input (2110). Output module 2112 may then output the data object, either as a standalone playback or as part of a larger graphical environment, to relive and/or share that memory with the user and/or other users (2112).

Figure 22:
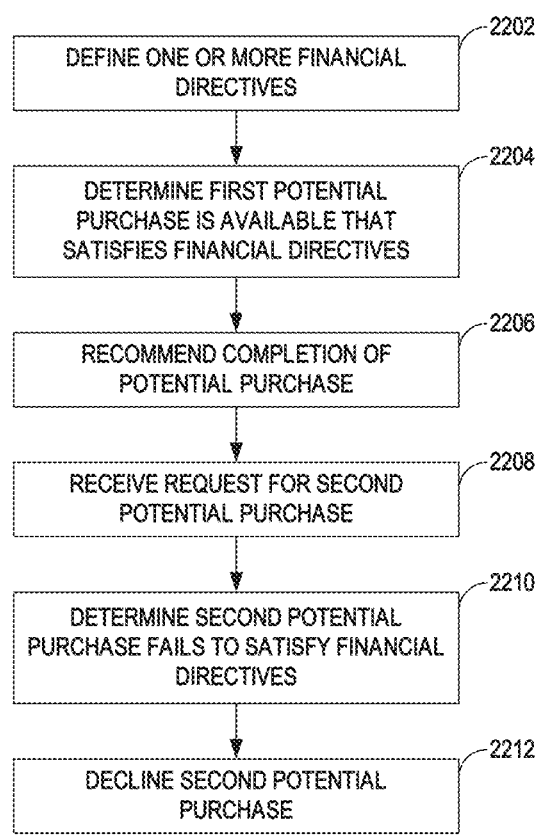
FIG. 22 is a flow diagram illustrating an example technique of this disclosure.

FIG. 22 is a flow diagram illustrating an example technique of this disclosure. The techniques of FIG. 22 may be performed by one or more processors of a computing device, such as computing device 110 of FIG. 1 and/or computing device 210 illustrated in FIG. 2. For purposes of illustration only, the techniques of FIG. 22 are described within the context of computing device 210 of FIG. 2, although computing devices having configurations different than that of computing device 210 may perform the techniques of FIG. 22.

In accordance with the techniques of this disclosure, curation module 220 may define one or more financial directives in model 226 (2202). Curation module 220 may determine, using model 226, that a potential purchase is available that satisfies one of the one or more financial directives (2204). Output module 222 may recommend, to a trustee designated by the user, to complete the potential purchase using the currency in a financial account associated with a user (2206).

At another time, curation module 220 may receive a request for a second potential purchase from the trustee (2208). Curation module 220 may determine, using model 226, that the second potential purchase fails to satisfy any of the one or more financial directives (2210). Output module 222 may then decline the second potential purchase (2212).

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples of the disclosure have been described. Any combination of the described systems, operations, or functions is contemplated. These and other examples are within the scope of the following claims.

What is claimed is:

1. A method comprising:
   receiving, by one or more processors of a computing device, a first data object;
   analyzing, by the one or more processors and using a model, the first data object to determine one or more classifications for the first data object;
   storing, by the one or more processors, the first data object and the one or more classifications for the first data object in a storage component of the computing device along with a plurality of data objects;
   defining, by the one or more processors, one or more privacy settings for the first data object, the one or more privacy settings defining access for one or more other users of a social platform over which the first data object is shared with the one or more other users;

generating, by the one or more processors, a graphical environment comprising at least the first data object of the plurality of data objects and the one or more privacy settings for the first data object;

sending, by the one or more processors, the graphical environment to a server device of the social platform with the one or more privacy settings for the graphical environment;

generating, by the one or more processors and based on the model, an artificial intelligence profile comprising one or more of vocal characteristics of the user, relationships for the user, personal information for the user, likes for the user, dislikes for the user, visual characteristics for the user, experiences of the user, and any other defining characteristic for the user;

generating, by the one or more processors, a computerized avatar that acts in accordance with the artificial intelligence profile; and including, by the one or more processors, the computerized avatar in the graphical environment.

2. The method of claim 1, wherein the first data object comprises one or more of a video object, a picture object, a text object, and an audio object.

3. The method of claim 1, wherein receiving the first data object comprises one or more of:
retrieving the first data object from a database associated with a social media platform;
receiving the first data object sent from a media capture device;
receiving the first data object from a secondary computing device via a wired transmission or a wireless transmission; and
receiving a transmission including the first data object from a secondary storage device.

4. The method of claim 1, wherein receiving the first data object comprises:
determining, based on one or more privacy settings, that a user has granted permission for the first data object to be received by the computing device; and
in response to determining that the user has granted permission for the first data object to be received by the computing device, receiving the first data object.

5. The method claim 1, wherein the model comprises a machine learning model, and wherein analyzing the first data object comprises analyzing, by the one or more processors and using the machine learning model, one or more of content of the first data object and metadata for the first data object to determine the one or more classifications for the first data object.

6. The method of claim 5, further comprising:
receiving, by the one or more processors, the machine learning model from a server device that trains the machine learning model using data objects received from each of a plurality of computing devices.

7. The method of claim 5, further comprising one or more of:
receiving, by the one or more processors, training data from a server device and updating, by the one or more processors, the machine learning model based on the training data; and
receiving, by the one or more processors, personal data collected by a third-party internet service and updating, by the one or more processors, the machine learning model based on the personal data.

8. The method of claim 5, further comprising:
outputting, by the one or more processors, the one or more classifications for the first data object;
receiving, by the one or more processors, an indication of first user input altering one or more of the one or more classifications to create one or more updated classifications;
receiving, by the one or more processors, an indication of second user input confirming one or more of the one or more classifications to create one or more confirmed classifications;
updating, by the one or more processors, the machine learning model based on the one or more updated classifications and the one or more confirmed classifications.

9. The method of claim 5, further comprising:
performing, by the one or more processors, an initial analysis on the first data object to determine one or more uncertainties regarding the content of the first data object;
creating, by the one or more processors, one or more inquiries for each of the one or more uncertainties;
receiving, by the one or more processors, an answer for one or more of the one or more inquiries; and
determining, by the one or more processors, the one or more classifications for the first data object based on the answer for the one or more of the one or more inquiries.

10. The method of claim 9, wherein the one or more inquiries comprise one or more of one or more textual inquiries, one or more audible inquiries, and one or more chatbot inquiries, wherein the method further comprises:
outputting, by the one or more processors, the one or more inquiries.

11. The method of claim 9, wherein creating the one or more inquiries comprise creating, by the one or more processors, the one or more inquiries for each of the one or more uncertainties using the model.

12. The method of claim 9, further comprising:
analyzing, by the one or more processors and using the model, one or more of a narrative descriptive of the first data object and the answer to each respective inquiry of the one or more inquiries to further classify the respective data object with a feeling for the respective data object; and
grouping, by the one or more processors, the first data object with other data objects that are classified with similar feelings.

13. The method of claim 12, further comprising:
providing, by the one or more processors, memory therapy by presenting one or more data objects that have a same feeling classification.

14. The method of claim 1, wherein analyzing the first data object comprises determining, by the one or more processors, content for the first data object comprising one or more of:
audio analysis to determine one or more audible words or sounds present in the first data object,
graphical analysis to determine one or more living or non-living objects present in the first data object,
optical character recognition to determine one or more visible words in the first data object, and
metadata analysis to determine one or more of a location, time, and date of capture for the first data object.

15. The method of claim 1, wherein the one or more classifications for the first data object comprise one or more of:

one or more persons contained in the first data object,
one or more animals contained in the first data object,
one or more objects contained in the first data object,
one or more events associated with the first data object,
one or more locations associated with the first data object,
one or more dates associated with the first data object,
one or more times associated with the first data object,
one or more relationships with one or more subjects contained in the first data object, and
one or more times of year at which the first data object was created.

16. The method of claim 1, wherein each of the one or more classifications comprise either a previously created classification associated with a second data object stored in the storage component or a newly created classification not associated with any other data object in the storage component.

17. The method of claim 1, further comprising:
outputting, by the one or more processors, one or more requests for subjective feelings of the user regarding the first data object;
receiving, by the one or more processors, an indication of user input indicative of the subjective feelings of the user regarding the first data object; and
storing, by the one or more processors, the subjective feelings of the user regarding the first data object in the storage component with the first data object and the one or more classifications.

18. The method of claim 17, further comprising:
updating, by the one or more processors, the model based on the subjective feelings of the user regarding the first data object.

19. The method of claim 1, further comprising:
editing, by the one or more processors, the first data object to remove one or more portions of the first data object prior to create an edited data object; and
storing, by the one or more processors, the edited data object in the storage component.

20. The method of claim 19, wherein editing the first data object comprises:
determining, by the one or more processors, each of the one or more portions of the first data object to be removed as a portion that includes undesirable content.

21. The method of claim 1, wherein the method further comprises:
storing, by the one or more processors, the plurality of data objects in the storage component, wherein each of the plurality of data objects is stored with one or more classifications for the respective data object.

22. The method of claim 21, further comprising:
receiving, by the one or more processors, an indication of user input indicative of one or more requested classifications;
in response to receiving the indication of user input, retrieving, by the one or more processors and from the storage component, one or more of the plurality of data objects with respective classifications that are equal to the one or more requested classifications, wherein the one or more of the plurality of data objects includes a second data object; and
outputting, by the one or more processors, at least an indication of the second data object.

23. The method of claim 1, further comprising:
outputting, by the one or more processors, a request for a narrative descriptive of the first data object, wherein the narrative comprises a written narrative or an audible narrative;
receiving, by the one or more processors, an indication of user input that includes the narrative for the first data object; and
storing, by the one or more processors, the narrative for the first data object in the storage component.

24. The method of claim 23, further comprising:
outputting, by the one or more processors, the first data object; and
outputting, by the one or more processors with the first data object, the narrative for the first data object.

25. The method of claim 1, further comprising:
receiving, by the one or more processors, a request to access the first data object;
outputting, by the one or more processors, the first data object; and
increasing, by the one or more processors, an access counter for the first data object.

26. The method of claim 25, wherein the storage component stores the plurality of data objects including the first data object, and wherein the method further comprises:
outputting, by the one or more processors, an interface for accessing a subset of the plurality of data objects, the subset including a number of data objects with a greatest respective access counter.

27. The method of claim 1, further comprising:
generating, by the one or more processors, a second graphical environment comprising a second set of one or more of the plurality of data objects; and
sending, by the one or more processors, the second graphical environment to the server device of the social platform with a second set of one or more privacy settings for the graphical environment.

28. The method of claim 1, further comprising:
receiving, by the one or more processors, an indication of user input indicative of a requested update to the graphical environment;
generating, by the one or more processors and based on the requested update to the graphical environment, an updated graphical environment; and
sending, by the one or more processors, the updated graphical environment to the server device of the social platform.

29. The method of claim 1, further comprising:
requesting, by the one or more processors, a friendly graphical environment from the server device, wherein the friendly graphical environment comprises one or more data objects associated with a second user different than the user;
in response to the server device determining that the user is allowed access to the friendly graphical environment, receiving, by the one or more processors, the friendly graphical environment; and
outputting, by the one or more processors, the friendly graphical environment.

30. The method of claim 1, wherein the graphical environment includes a particular arrangement of the one or more of the plurality of data objects, and wherein the graphical environment comprises one or more of:
a flat graphical user interface containing the particular arrangement;
a virtual reality user interface containing the particular arrangement;
an augmented reality user interface containing the particular arrangement;
an audio user interface containing the particular arrangement; and an extended reality user interface containing the particular arrangement.

31. The method of claim 1, wherein the computerized avatar is configured to interact with one or more other users in the graphical environment of the user.

32. The method of claim 1, further comprising:
defining, by the one or more processors, a longevity setting comprising a permission or denial of permission for the computer device to allow access to one or more aspects of the storage component after the user passes away.

33. The method of claim 1, further comprising:
removing, by the one or more processors, personally identifiable information from one or more objects in the storage component to generate a set of anonymous information; and
sending, by the one or more processors, the set of anonymous information to the server device to be used for training a universal machine learning model.

34. The method of claim 1, wherein the computing device is a standalone computing device that includes the storage component.

35. The method of claim 1, wherein the storage component comprises a cloud storage component that the computing device accesses via a network.

36. The method of claim 1, wherein storing the first data object comprises:
creating, by the one or more processors, a reference to the first data object in a blockchain.

37. The method of claim 1, wherein receiving the first data object comprises:
recording, by the one or more processors, a video conference with a plurality of users to create a video recording, wherein the one or more classifications for the first data object include each of the plurality of users in the video conference; and
saving, by the one or more processors, the video recording as the first data object.

38. The method of claim 1, further comprising:
receiving, by the one or more processors, one or more user death directives;
receiving, by the one or more processors, an indication of user input that completes one of the one or more user death directives; and
issuing, by the one or more processors, a user-defined reward to the user that completed the one of the one or more user death directives.

39. The method of claim 1, wherein the computing device includes a removable storage component.

40. The method of claim 1, further comprising:
creating, by the one or more processors, a financial account for the user; and
storing, by the one or more processors, currency in the financial account, wherein the currency comprises one or more of pre-deposited currency or cryptocurrency.

41. The method of claim 40, further comprising:
defining, by the one or more processors, one or more financial directives in the model;
determining, by the one or more processors and using the model, that a potential purchase is available that satisfies one of the one or more financial directives;
recommending, by the one or more processors and to a trustee designated by the user, to complete the potential purchase using the currency in the financial account.

42. The method of claim 41, further comprising:
receiving, by the one or more processors, a request for a second potential purchase from the trustee;
determining, by the one or more processors and using the model, that the second potential purchase fails to satisfy any of the one or more financial directives; and
declining, by the one or more processors, the second potential purchase.

43. The method of claim 40, further comprising:
linking, by the one or more processors, the financial account to a physical charge card funded by the financial account.

44. The method of claim 1, further comprising:
receiving, by the computing device, a physical specimen of DNA for the user; and
storing, by the computing device, the physical specimen of the DNA for the user.

45. The method of claim 1, further comprising:
creating, by the one or more processors, a non-fungible token (NFT); and
attaching, by the one or more processors, the NFT to the first data object.

46. The method of claim 45, further comprising:
receiving, by the one or more processors, a second data object;
analyzing, by the one or more processors and using the model, the second data object to determine one or more classifications for the second data object;
storing, by the one or more processors, the second data object and the one or more classifications for the second data object in the storage component of the computing device;
creating, by the one or more processors, a second NFT; and
attaching, by the one or more processors, the second NFT to the second data object.

47. The method of claim 45, further comprising:
posting, by the one or more processors, the first data object and the NFT to a marketplace;
receiving, by the one or more processors, a payment to rent or purchase the NFT and the first data object; and
placing, by the one or more processors, the payment in a financial account associated with the user.

48. The method of claim 1, wherein the computing device only includes a single physical port that connects the computing device to a power source.

49. A computing device comprising:
a memory; and
one or more processors configured to:
receive a first data object;
analyze, using a model, the first data object to determine one or more classifications for the first data object;
store the first data object and the one or more classifications for the first data object in the memory of the computing device along with a plurality of data objects;
define one or more privacy settings for the first data object, the one or more privacy settings defining access for one or more other users of a social platform over which the first data object is shared with the one or more other users;
generate a graphical environment comprising at least the first data object of the plurality of data objects and the one or more privacy settings for the first data object;
send the graphical environment to a server device of the social platform with the one or more privacy settings for the graphical environment;

generate, based on the model, an artificial intelligence profile comprising one or more of vocal characteristics of the user, relationships for the user, personal information for the user, likes for the user, dislikes for the user, visual characteristics for the user, experiences of the user, and any other defining characteristic for the user;

generate a computerized avatar that acts in accordance with the artificial intelligence profile; and include the computerized avatar in the graphical environment.

50. A non-transitory computer-readable storage medium comprising instructions that, when executed by one or more processors of a computing device, cause the one or more processors to:

receive a first data object;

analyze, using a model, the first data object to determine one or more classifications for the first data object;

store the first data object and the one or more classifications for the first data object in a storage component of the computing device along with a plurality of data objects;

define one or more privacy settings for the first data object, the one or more privacy settings defining access for one or more other users of a social platform over which the first data object is shared with the one or more other users;

generate a graphical environment comprising at least the first data object of the plurality of data objects and the one or more privacy settings for the first data object;

send the graphical environment to a server device of the social platform with the one or more privacy settings for the graphical environment;

generate, based on the model, an artificial intelligence profile comprising one or more of vocal characteristics of the user, relationships for the user, personal information for the user, likes for the user, dislikes for the user, visual characteristics for the user, experiences of the user, and any other defining characteristic for the user;

generate a computerized avatar that acts in accordance with the artificial intelligence profile; and include the computerized avatar in the graphical environment.

\* \* \* \* \*